United States Patent
Date et al.

(10) Patent No.: US 8,040,408 B2
(45) Date of Patent: Oct. 18, 2011

(54) IMAGE SIGNAL PROCESSING APPARATUS, IMAGE CAPTURING APPARATUS, AND IMAGE SIGNAL PROCESSING METHOD

(75) Inventors: Yoshihiro Date, Kanagawa (JP); Yoshinari Hirohata, Kanagawa (JP); Isamu Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 400 days.

(21) Appl. No.: 12/406,159

(22) Filed: Mar. 18, 2009

(65) Prior Publication Data
US 2009/0237523 A1  Sep. 24, 2009

(30) Foreign Application Priority Data
Mar. 19, 2008  (JP) .............................. P2008-071706

(51) Int. Cl.
*H04N 5/208* (2006.01)
*H04N 5/14* (2006.01)
*H04N 5/21* (2006.01)
*G06K 9/40* (2006.01)

(52) U.S. Cl. ........... 348/252; 348/26; 348/625; 382/266
(58) Field of Classification Search ........................ None
See application file for complete search history.

(56) References Cited

U.S. PATENT DOCUMENTS

| | | | | |
|---|---|---|---|---|
| 7,932,940 B2* | 4/2011 | Kawamura et al. | ........... | 348/253 |
| 2003/0190090 A1* | 10/2003 | Beeman et al. | ............... | 382/284 |
| 2010/0119157 A1* | 5/2010 | Kameyama | ................... | 382/195 |

FOREIGN PATENT DOCUMENTS

| | | |
|---|---|---|
| JP | 9 139952 | 5/1997 |
| JP | 9 331543 | 12/1997 |
| JP | 2001 211351 | 8/2001 |
| JP | 2001 333299 | 11/2001 |
| JP | 2002 135653 | 5/2002 |
| JP | 2008 61202 | 3/2008 |

* cited by examiner

*Primary Examiner* — Justin P Misleh
(74) *Attorney, Agent, or Firm* — Frommer Lawrence & Haug LLP; William S. Frommer

(57) ABSTRACT

An image signal processing apparatus is disclosed. A peaking signal generation section extracts and amplifies high frequency components contained in an input image signal to generate a peaking signal. An operation section allows a target area for which contour correction is to be performed using the peaking signal to be accepted. A control section generates an area gate signal describing position information corresponding to the designated target area. A mask processing section performs a mask process of outputting an image signal to which the peaking signal has been added to the target area designated through the operation section based on the area gate signal supplied from the control section. A scaling processing section converts pixels of the image signal for which the mask process has been performed is converted at a predetermined scaling ratio.

13 Claims, 14 Drawing Sheets

 CONTOUR CORRECTION VALID AREA
FIG. 5A
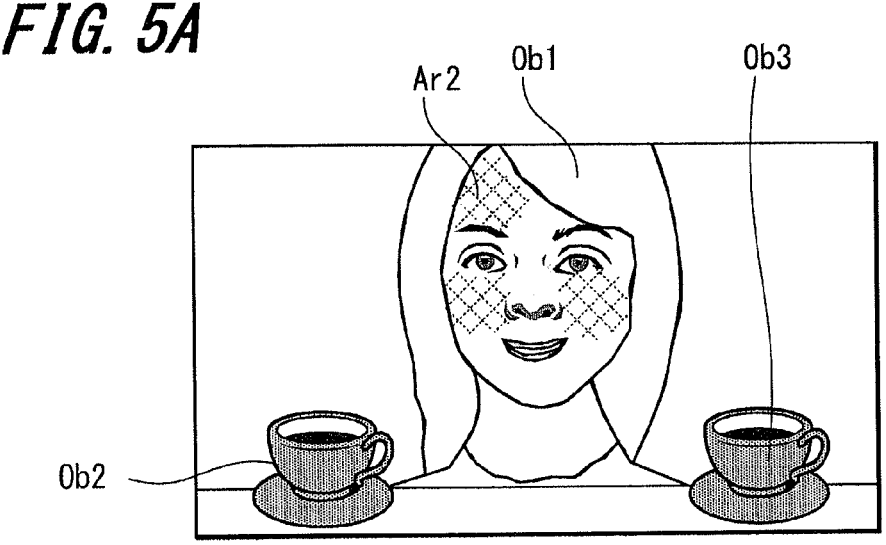
FIG. 5B
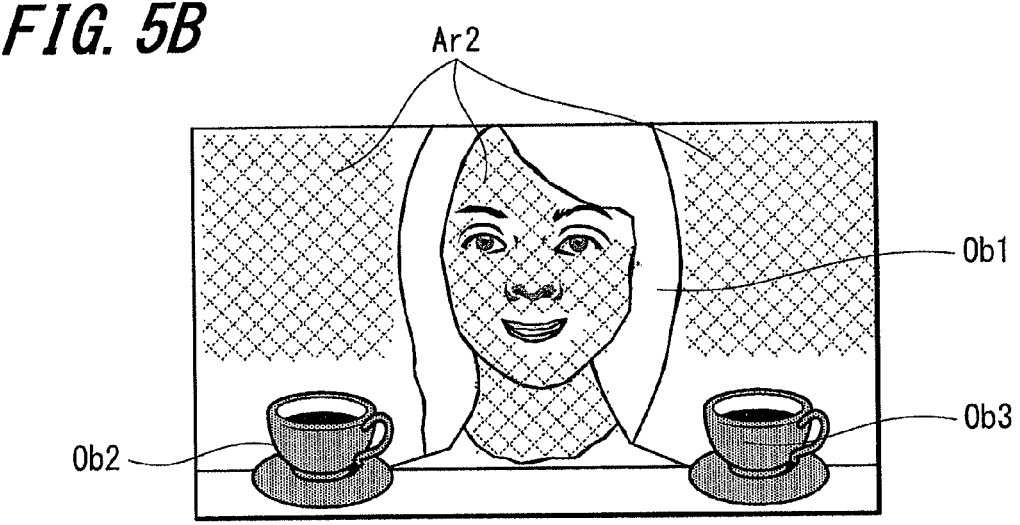

 CONTOUR CORRECTION VALID AREA
FIG. 11A
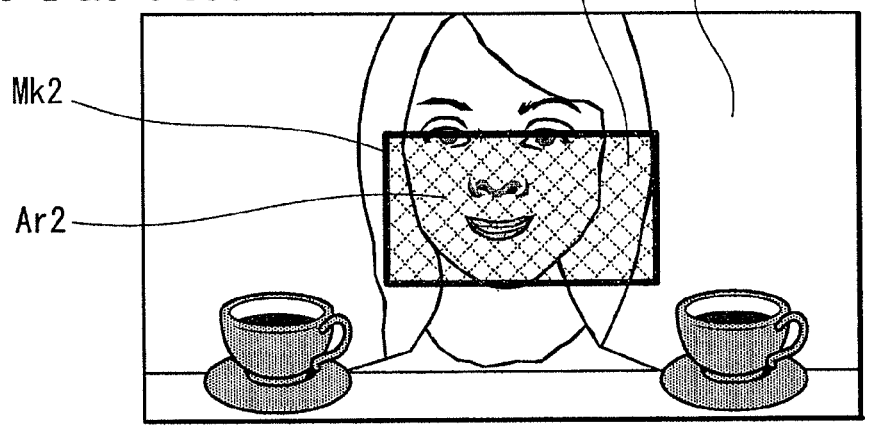
FIG. 11B
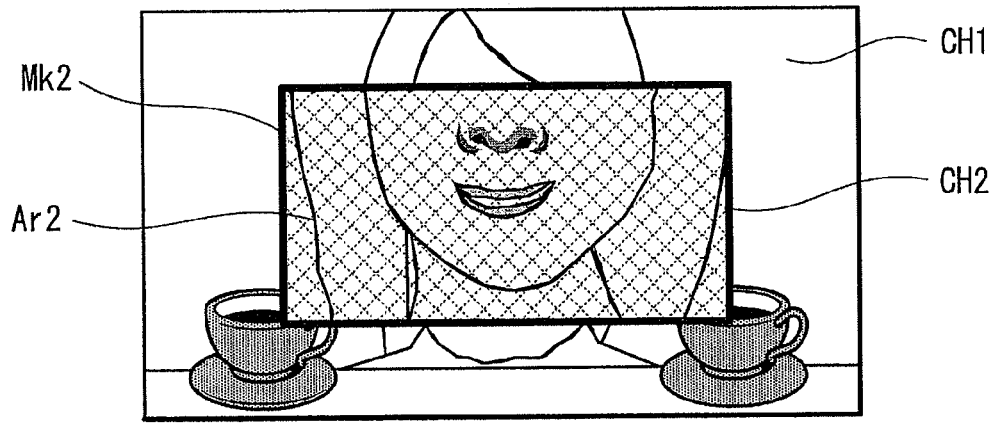
FIG. 11C
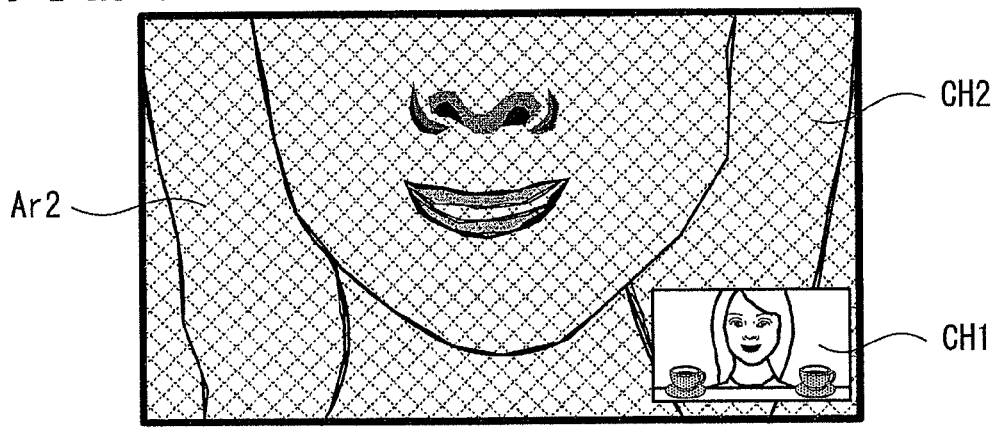

 CONTOUR CORRECTION VALID AREA
*FIG. 12A*
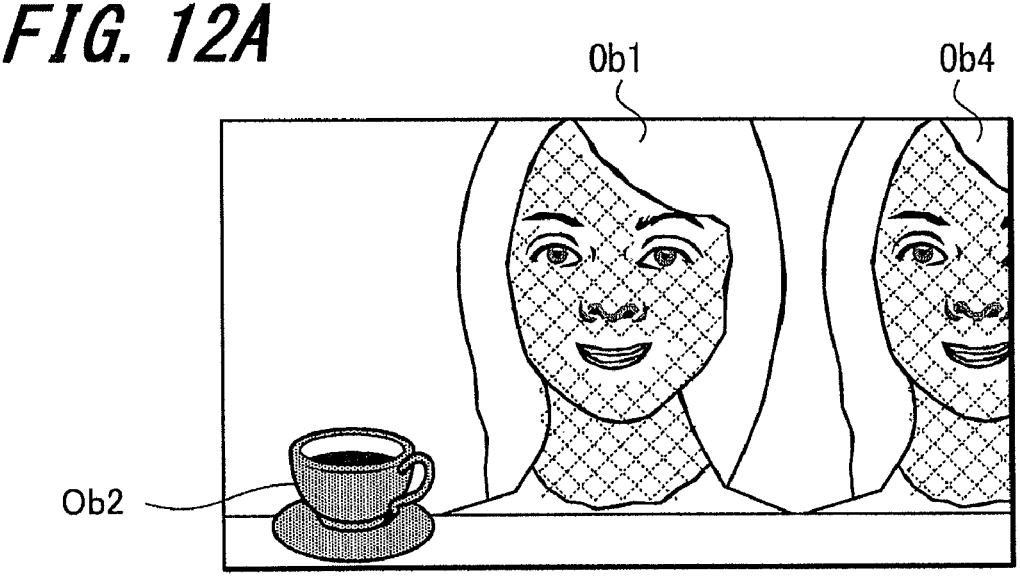
*FIG. 12B*
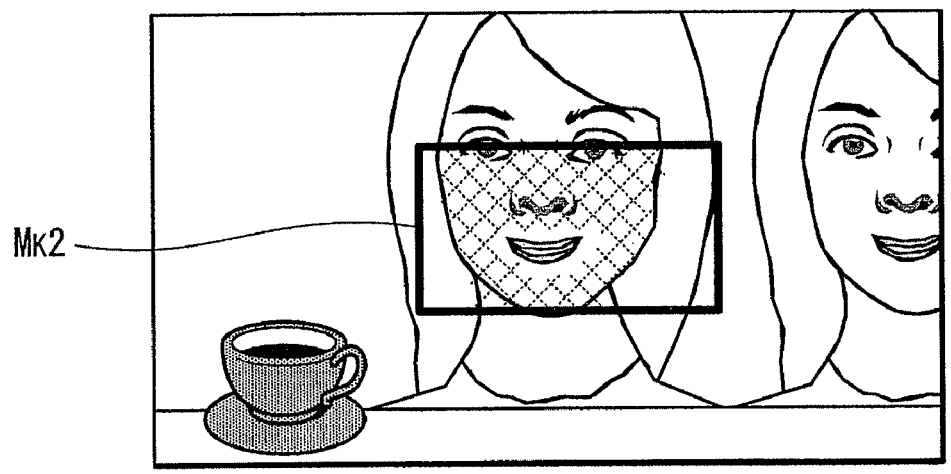

IMAGE SIGNAL PROCESSING APPARATUS, IMAGE CAPTURING APPARATUS, AND IMAGE SIGNAL PROCESSING METHOD

BACKGROUND OF THE INVENTION

1. Field of the Invention

The present invention relates to an image signal processing apparatus, an image capturing apparatus, and an image signal processing method, and more particularly to an image signal processing technique that performs peaking that emphasizes an edge portion or the like of an image displayed for easy focus adjustment.

2. Description of the Related Art

In a video camera used for a broadcasting station and a camera-built-in type video tape recorder of related art, to easily perform focus adjustment, a captured image whose high frequency components are emphasized and whose contour is clarified is displayed on a viewfinder. At this point, the captured image displayed on the viewfinder is composed by adding an image signal obtained by an image capturing apparatus such as a video camera and a peaking signal.

The peaking signal is a signal generated by extracting high frequency components from a luminance signal that composes an image signal and amplifying the extracted high frequency components. By adding the peaking signal generated in such a manner to the image signal and outputting the resultant signal to the viewfinder, the captured image is displayed on the viewfinder such that the contour portion or the like of the image is emphasized. When the photographer (also called the user) watches such an image on the screen, he or she can easily perform focus adjustment.

FIG. 1 is a block diagram showing an example of a structure of an image capturing apparatus 200 of related art, the image capturing apparatus 200 displaying a captured image whose high frequency components are emphasized. The image capturing apparatus 200 shown in FIG. 1 includes a camera section 150 and a viewfinder section 160. First, the structure of the camera section 150 will be described. The camera section 150 includes as an optical system an image-capturing lens 101, a lens barrel 102, and a prism 103. Image sensors 104B, 104G, and 104R capture an image. The image capturing apparatus 200 is structured such that image signals captured by the image sensors 104B, 104G, and 104R are processed by a video amplifier 105, an analog-to-digital conversion section 106 (hereinafter referred to as the A/D conversion section 106), a digital signal processing section 107, and a digital-to-analog conversion section (hereinafter referred to as the D/A conversion section 108).

The image-capturing lens 101 focuses an optical image of an object on respective photosensitive planes (not shown) of the image sensors 104B, 104G, and 104R and has a focus adjustment function. The lens barrel 102 is a barrel that holds the image-capturing lens 101. The prism 103 separates light entered through the image-capturing lens 101 into rays of light of three primary colors R (red), G (green), and B (blue).

The image sensors 104B, 104G, and 104R photoelectrically convert light of rays of individual colors separated by the prism 103 into image signals AB, AG, and AR and output the obtained image signals AB, AG, and AR to the video amplifier 105. The video amplifier 105 amplifies the image signals AB, AG, and AR that are output from the image sensors 104B, 104G, and 104R and outputs amplified image signals AB', AG', and AR' to the A/D conversion section 106. The A/D conversion section 106 converts the image signals AB', AG', and AR' that are output from the video amplifier 105 into digital image signals DB, DG, and DR, respectively.

The digital signal processing section 107 performs a digital signal process including a matrix process for the image signals DR, DG, and DB, generates a luminance signal DY and color difference signals DU and DV, and outputs the generated individual signals to the D/A conversion section 108. The D/A conversion section 108 converts the digital luminance signal DY that is output from the digital signal processing section 107 into an analog luminance signal AY and the digital color difference signals DU and DV that are output from the digital signal processing section 107 into analog color difference signals AU and AY and then outputs the generated luminance signal AY and color difference signals DU and DV to the viewfinder section 160.

The viewfinder section 160 includes a video amplifier 109, a band limit filter 110, an A/D conversion section 111, a peaking signal generation section 112, a multiplying device 113, an adding device 114, a scaling processing section 115, a matrix processing section 116, a display device drive section 117, and a display device 118.

The video amplifier 109 amplifies the luminance signal AY and the color difference signals AU and AV that are output from the D/A conversion section 108 of the camera section 150 and supplies amplified luminance signals AY' and color difference signals AU' and AV' to the band limit filter 110. The band limit filter 110 is composed of a low-pass filter or a band-pass filter, limits frequency bands of the luminance signal AY' and color difference signals AU' and AV' and outputs band-limited luminance signal AY" and color difference signals AU" and AV" to the A/D conversion section 111.

The A/D conversion section 111 converts the luminance signal AY" and the color difference signals AU" and AV" that are output from the band limit filter 110 into a digital luminance signal DY and digital color difference signals DU and DV, and outputs the luminance signal DY to the peaking signal generation section 112 and the adding device 114 and the color difference signals DU and DV to the scaling processing section 115.

The peaking signal generation section 112 extracts high frequency components from the luminance signal that is output from the A/D conversion section 111 and generates a peaking signal based on the high frequency components. Thereafter, the peaking signal generation section 112 outputs the generated peaking signal to the multiplying device 113. The multiplying device 113 multiplies a peaking level setting signal supplied from a control section (not shown) by a peaking signal that is output from the peaking signal generation section 112 and outputs a resultant peaking signal PEAK to the adding device 114.

The peaking level setting signal is a signal that sets the peaking level (intensity). The peaking level can be set by the user (photographer) through an operation section or the like (not shown). Thus, the peaking signal PEAK that is generated by multiplying the peaking setting signal and the peaking signal and that is output from the multiplying device 113 becomes a peaking signal whose level has been adjusted to a predetermined value.

The adding device 114 adds the luminance signal DY that is output from the A/D conversion section 111 and the peaking signal PEAK that is output from the multiplying device 113 and outputs a resultant luminance signal DYpk to the scaling processing section 115. The scaling processing section 115 performs pixel conversion that converts the number of pixels based on the number of pixels of the display device 118 and interlace-to-progressive (i/p) conversion to the luminance signal DYpk that is output from the adding device 114 and the color difference signals DU and DV that are output from the A/D conversion section 111. The scaling processing section 115 outputs resultant luminance signal DYpk' and color difference signals DU' and DV' to the matrix processing section 116.

The matrix processing section 116 converts the luminance signal DYpk' and the color difference signals DU' and DV' into RGB image signals, generates resultant image signals DRpk, DGpk, and DBpk, and outputs the individually generated image signals to the display device drive section 117. The display device drive section 117 generates a drive signal that drives the display device 118 and supplies the drive signal to the display device 118. The display device 118 is composed of a liquid crystal display (LCD) or the like and displays an image based on the drive signal supplied from the display device drive section 117.

The image signals DRpk, DGpk, and DBpk that compose an image displayed on the display device 118 are image signals to which the peaking signal generated in the peaking signal generation section 112 has been added. Thus, an image whose contour portion or the like is emphasized is displayed on the display device 118.

For example, Japanese Unexamined Patent Application Publication No. HEI 09-139952, referred to as Patent Document 1, describes a technique that emphasizes a contour portion of a captured image displayed on a viewfinder that uses a color liquid crystal display device.

SUMMARY OF THE INVENTION

However, in the foregoing viewfinder and image capturing apparatus of related art, since the range in which peaking is performed is not able to be designated, the entire contour portion of the captured image displayed on the viewfinder is emphasized. Thus, if an image of an object is captured by increasing the depth of field, the contours of all portions other than an object for which focus adjustment is to be performed are emphasized. In other words, there was a problem that the user was difficult to determine which portion of the image was the most in focus.

On the other hand, the scaling processing section tends to perform a reduction process for pixels according to the resolution of the display device. When such a process is performed, the resolution of an image displayed on the display device is restricted by that of the display device. Thus, there was a problem that the user was difficult to perform focus adjustment.

In view of the foregoing, it would be desirable to easily perform focus adjustment.

According to an embodiment of the present invention, there is provided an image signal processing apparatus. The image signal processing apparatus includes a peaking signal generation section, an operation section, a control section, a mask processing section, a scaling processing section. The peaking signal generation section extracts and amplifies high frequency components contained in an input image signal to generate a peaking signal. The operation section allows a target area for which contour correction is to be performed using the peaking signal to be accepted. The control section generates an area gate signal describing position information corresponding to the designated target area. The mask processing section performs a mask process of outputting an image signal to which the peaking signal has been added to the target area designated through the operation section based on the area gate signal supplied from the control section. The scaling processing section converts pixels of the image signal for which the mask process has been performed is converted at a predetermined scaling ratio. When the image signal for which the contour correction has been performed has been caused to be displayed in an enlarged size through the operation section, a value of the scaling ratio applied to the image signal that is output to the designated target area is caused to be larger than a value of a scaling ratio applied to an image signal that is output to other than the designated target area.

Thus, an area in which contour is to be corrected with a peaking signal is limited to an area designated as a contour correction target area through an operation section.

A display enlargement ratio of an image corresponding to an image signal to which a peaking signal has been added is changed based on a value of a scaling ratio that is set to a scaling processing section.

According to an embodiment of the present invention, since an area in which contour is to be corrected with a peaking signal is limited to an area designated as a contour correction target area through an operation section, the user can perform the contour correction process only for an area of an object for which focus adjustment is to be performed. Thus, the user can easily perform focus adjustment.

In addition, since a display enlargement ratio of an image of an image signal to which a peaking signal is added is changed based on a value of a scaling ratio that is set to a scaling processing section, an image whose contour has been corrected and for which focus adjustment is to be performed can be displayed in an enlarged size.

Thus, since the resolution of an object for which focus adjustment is to be performed is increased, the user can easily perform focus adjustment while checking for details.

BRIEF DESCRIPTION OF THE DRAWINGS

The invention will become more fully understood from the following detailed description, taken in conjunction with the accompanying drawings, wherein similar reference numerals denote corresponding elements, in which:

FIG. 5A and FIG. 5B are explanatory diagrams showing an example of a range of the contour correction valid area according to an embodiment of the present invention, FIG. 5A showing a display example in which the range of the contour correction valid area is narrowed, FIG. 5B showing a display example in which the contour correction valid area is widened;

FIG. 11A, FIG. 11B, and FIG. 11C are explanatory diagrams showing display examples when individual enlarged display modes according to an embodiment of the present invention are selected, FIG. 11A showing a display example when "enlarged display mode off" is selected, FIG. 11B showing a display example when "enlarged display mode 1" is selected, FIG. 11C showing a display example when "enlarged display mode 2" is selected;

FIG. 12A and FIG. 12B are explanatory diagrams showing display examples when the color-selected contour correction mode and the image-area-selected contour correction mode according to an embodiment of the present invention are used together, FIG. 12A showing a display example when only the color-selected contour correction mode is selected, FIG. 12B showing a display example when the color-selected contour correction mode and the image-area-selected contour correction mode are used together;

DETAILED DESCRIPTION OF THE PREFERRED EMBODIMENTS

Next, with reference to FIG. 2 to FIG. 12, an embodiment of the present invention will be described. In the image capturing apparatus of this embodiment, the user is allowed to freely designate a range in which a peaking process (hereinafter also referred to as the contour correction process) is to be performed. In this example, the range in the peaking process is to be performed can be identified by designating a color component contained an image signal and a display area on the screen of a viewfinder.

In a "color-selected contour correction mode" in which the range in the peaking process is to be performed is identified by designating a color component, the user is caused to designate any region on the screen such that a peaking signal is added to only an image signal having a color component close to a color component detected in the area. In an "area-selected contour correction mode" in which the range in which the peaking process is to be performed is identified by designating an area on the screen, a peaking signal is added to an image signal displayed in an area designated by the user and the peaking process is not performed in other than the designated area.

In this embodiment, a "standard contour correction mode" (similar to the corresponding function of the related art) in which the range in which the peaking process is to be performed is not identified is provided along with the foregoing two modes. The image capturing apparatus is structured to allow the user to freely select one of these three modes.

In addition, the image capturing apparatus is provided with a function that causes an image whose contour has been corrected and used to perform focus adjustment and an image whose contour has not been corrected and used to check for the composition to be displayed simultaneously on the same screen and an image whose contour has been corrected to be displayed in an enlarged size. As display modes, three modes "enlarged display mode 1", "enlarged display mode 2", and "standard contour correction mode" in which an enlarged display is not used are provided such that the user can select one of these modes.

In this embodiment, one image capturing apparatus has three contour correction modes and three enlarged display modes. However, this embodiment is not limited to such a structure. For example, the image capturing apparatus may have only two contour correction modes "area-selected contour correction mode" and "standard contour correction mode" and two enlarged display modes.

Figure 1:
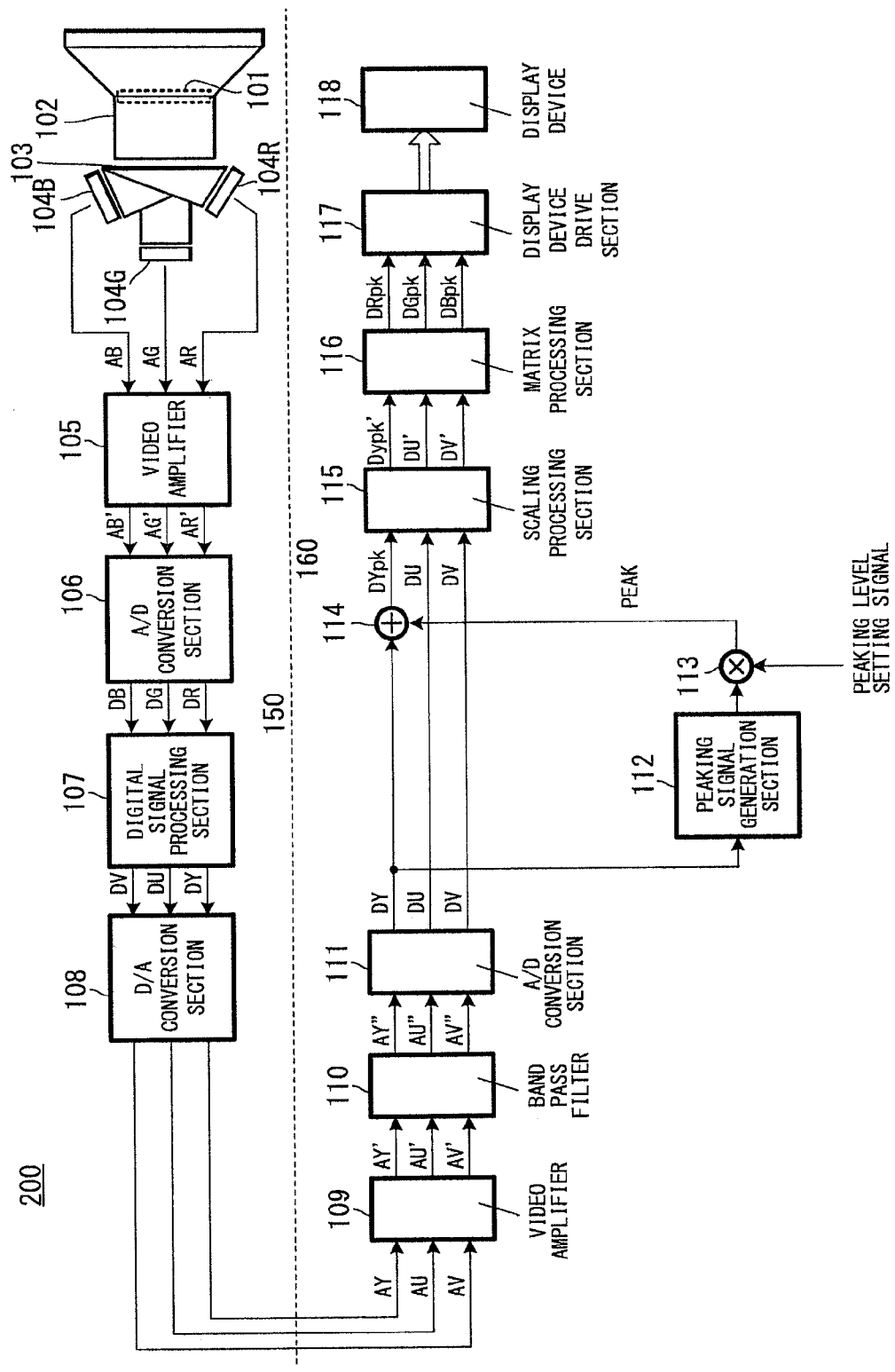
FIG. 1 is a block diagram showing an example of a structure of an image capturing apparatus of a related art.
Figure 2:
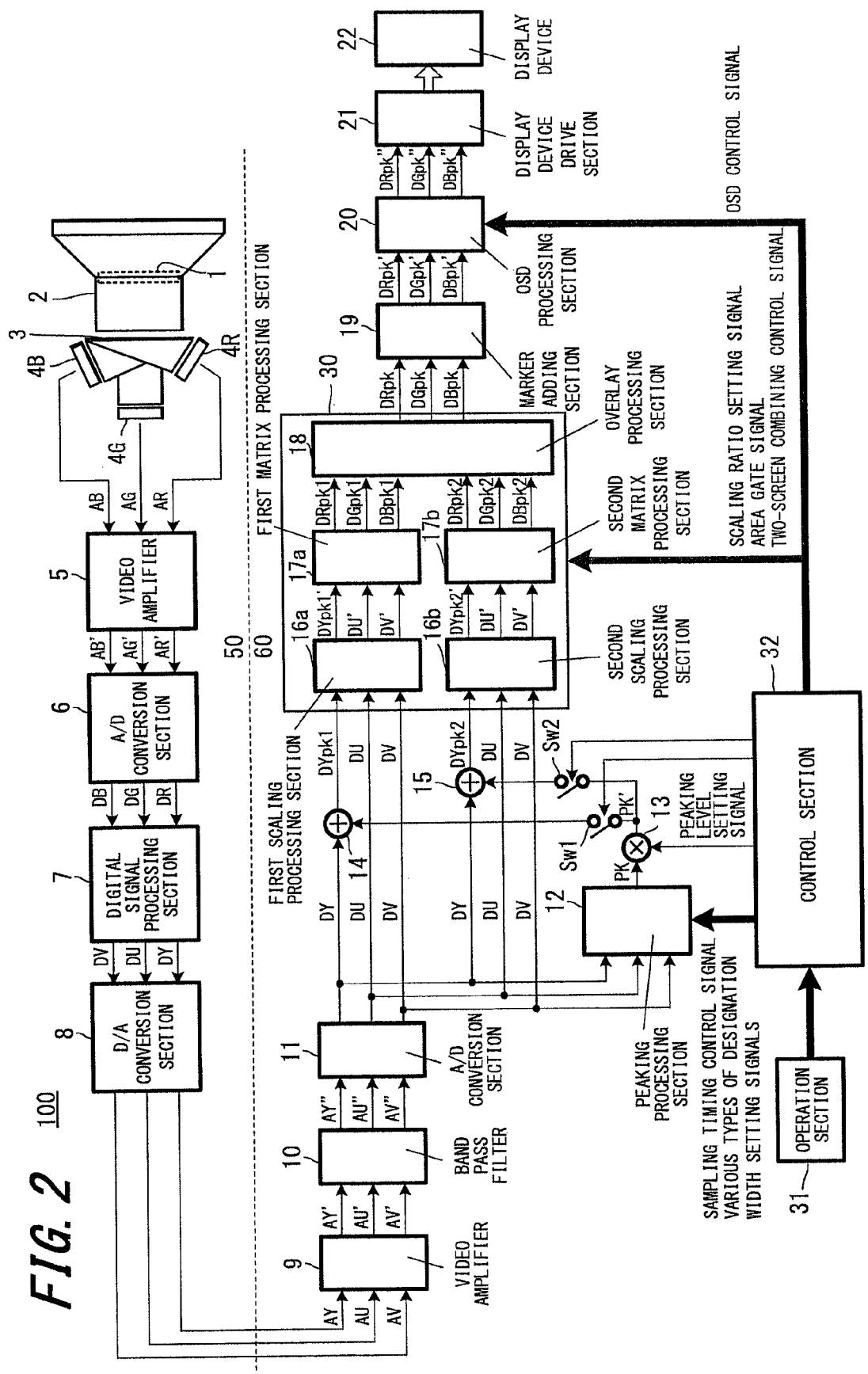
FIG. 2 is a block diagram showing an example of an internal structure of the image capturing apparatus according to an embodiment of the present invention.

FIG. 2 is a block diagram showing an example of a structure of an image capturing apparatus 100 of this embodiment. The image capturing apparatus 100 shown in FIG. 2 includes a camera section 50 and a viewfinder section 60. First, the structure of the camera section 50 will be described. The camera section 50 includes as an optical system an image capturing lens 1, a lens barrel 2, and a prism 3. Image sensors 4B, 4G, and 4R capture an image of an object. Image signals of the image obtained by the image sensors 4B, 4G, and 4R are processed by an A/D conversion section 6, a digital signal processing section 7, and a D/A conversion section 8.

The image capturing lens 1 focuses an optical image of an object on respective photosensitive planes (not shown) of the image sensors 4B, 4G, and 4R and has a focus adjustment function. The lens barrel 2 houses the image capturing lens 1 and is marked with an image magnification scale and a distance scale on the lateral surface. The prism 3 separates incident light entered through the image capturing lens 1 into three rays of light of three-primary colors R (red), G (green), and B (blue) and is composed of a dichroic prism or the like. In this embodiment, a three-plate type image capturing apparatus is exemplified. Instead, the image capturing apparatus may have another plate structure such as a single-plate type, a two-plate type, or a four-plate type.

The image sensors 4B, 4G, and 4R photoelectrically convert light of rays of individual colors separated by the prism 3 into image signals AB, AG, and AR and output the obtained image signals AB, AG, and AR to the video amplifier 5. Each of the image sensors 4B, 4G, and 4R are composed, for example, of a charge coupled device (CCD), a complementary metal oxide semiconductor (CMOS), or the like. The video amplifier 5 amplifies the image signals AB, AG, and AR that are output from the image sensors 4B, 4G, and 4R and outputs amplified image signals AB', AG', and AR' to the A/D conversion section 6. The A/D conversion section 6 converts the image signals AB', AG', and AR' that are output from the video amplifier 5 into digital image signals DB, DG, and DR, respectively.

The digital signal processing section 7 performs a digital signal process including a matrix process for the image signals DR, DG, and DB, generates a luminance signal DY and color difference signals DU and DV, and outputs the generated individual signals to the D/A conversion section 8. The D/A conversion section 8 converts the digital luminance signal DY that is output from the digital signal processing section 7 into an analog luminance signal AY and the digital color difference signals DU and DV that are output from the digital signal processing section 7 into analog color difference signals AU and AY and then outputs the generated luminance signal AY and color difference signals DU and DV to the viewfinder section 60.

The viewfinder section 60 includes a video amplifier 9, a band limit filter 10, an A/D conversion section 11, a peaking processing section 12 (which serves as a peaking signal generation section), a multiplying device 13, a switch Sw1, an adding device 14, a switch Sw2, an adding device 15, an image processing section 30, a marker adding section 19, an on-screen display (OSD) processing section 20, a display device drive section 21, a display device 22, an operation section 31, and a control section 32.

The image processing section 30 includes a first scaling processing section 16a, a second scaling processing section 16b, a first matrix processing section 17a, a second matrix processing section 17b, and an overlay processing section 18 (which serves as a mask processing section). Details of the individual sections of the image processing section 30 will be described later.

Signals exchanged between the camera section 50 and the viewfinder section 60 are not limited to analog signals, but may be digital signals. In this case, the D/A conversion section 8 in the camera section 50 and the video amplifier 9, the band limit filter 10, and the A/D conversion section 11 in the viewfinder section 60 are omitted.

The video amplifier 9 amplifies the luminance signal AY and the color difference signals AU and AV that are output from the D/A conversion section 8 of the camera section 50 and supplies amplified luminance signals AY' and color difference signals AU' and AV' to the band limit filter 10. The band limit filter 10 is composed of a low-pass filter or a band-pass filter, limits a frequency band of the luminance signal AY' and color difference signals AU' and AV' and outputs band-limited luminance signal AY" and color difference signals AU" and AV" to the A/D conversion section 11.

The A/D conversion section 11 converts the luminance signal AY" and the color difference signals AU" and AV" that are output from the band limit filter 10 into a digital luminance signal DY and digital color difference signals DU and DV and outputs the luminance signal DY to the peaking signal generation section 12 and the adding devices 14 and 15 and the color difference signals DU and DV to the peaking processing section 12, the first scaling processing section 16a, and the second scaling processing section 16b.

The peaking processing section 12 extracts high frequency components from the luminance signal DY that is output from the A/D conversion section 11 and generates a peaking signal PK based on the extracted high frequency components. When an image of an object is captured, if the object is out of focus, since the image is burring, the luminance signal DY does not contain high frequency components. Thus, the peaking processing section 12 does not generate the peaking signal PK. On the other hand, when the focus of the object is adjusted and it is nearly in focus, since the contour of the image becomes clear, high frequency components occur in the luminance signal DY of the contour portion. Thus, when the object is nearly in focus, the peaking processing section 12 generates the peaking signal PK based on high frequency components of the luminance signal DY. Details of the peaking processing section 12 will be described with reference to FIG. 3.

A sampling timing control signal, setting signals that set various types of designation widths such as "luminous designation width", "saturation ratio designation width", "hue designation width", and so forth (hereinafter referred to as various designation width setting signals) are supplied from the control section 32 to the peaking processing section 12. The sampling timing control signal is a signal that controls sampling on/off of a color component in an area designated by the user.

A control signal that causes sampling to be turned on (started) is generated by the control section 32 when it accepts a sampling start command input from the user through the operation section 31 or the like and is supplied to the peaking processing section 12. In this embodiment, an operation of pressing a contour correction mode selection switch for a long period is assigned as a trigger for generation of the control signal that causes sampling to be turned on. Instead, another operation may be assigned to this trigger. Details of the various designation width setting signals will be described later.

The multiplying device 13 multiplies the peaking level setting signal supplied from the control section 32 by the peaking signal PK that is output from the peaking processing section 12 and outputs a resultant peaking signal PK' to the switch Sw1 and the switch Sw2, respectively.

The peaking level setting signal is a signal that sets the peaking level (intensity). The peaking level can be set by the user through the operation section 31 or the like. Thus, the peaking signal PK' that is output from the multiplying device 13 is a peaking signal whose peaking level has been set at a predetermined value.

The switch Sw1 and the switch Sw2 are turned on and off based on control signals supplied from the control section 32. Specifically, when the user performs an operation that selects the "image-area-selected contour correction mode", the switches Sw2 and Sw1 are controlled to be turned on and off, respectively. When other than the "image-area-selected contour correction mode" is selected, the switches Sw1 and Sw2 are controlled to be turned on and off, respectively.

When the switch Sw1 is turned on, the peaking signal PK' whose peaking level has been adjusted is output to the adding device 14. When the switch Sw2 is turned on, the peaking signal PK' whose peaking level has been adjusted is output to the adding device 15.

The adding device 14 adds the peaking signal PK' sent through the switch Sw1 to the luminance signal DY that is output from the A/D conversion section 11 and outputs a resultant luminance signal DYpk1 to the first scaling processing section 16a. The adding device 15 adds the peaking signal PK' sent through the switch Sw2 to the luminance signal DY that is output from the A/D conversion section 11 and outputs a resultant luminance signal DYpk2 to the second scaling processing section 16b.

The first scaling processing section 16a performs a pixel conversion process for the luminance signal DYpk1 that is output from the adding device 14 and the color difference signals DU and DV that are output from the A/D conversion section 11 and an i/p conversion process corresponding to the resolution of the display device 22. Resultant luminance signal DYpk1' and color difference signals DU' and DV' are output to the first matrix processing section 17a. The second scaling processing section 16b performs the similar process as the first scaling processing section 16a. Namely, the second scaling processing section 16b performs a pixel conversion (enlargement or reduction) process for the luminance signal DYpk2 that is output from the adding device 15 and the color difference signals DU and DV that are output from the A/D conversion section 11 and performs an i/p conversion process corresponding to the resolution of the display device 22 and outputs resultant luminance signal DYpk2' and color difference signals DU' and DV' that have been processed to the second matrix processing section 17b.

In this case, the scaling ratio in pixel conversion is decided based on the scaling ratio setting signal supplied from the control section 32. The scaling ratio setting signal is output to the first scaling processing section 16a and the second scaling processing section 16*b* such that the scaling ratio is decided depending on which of display modes ("enlarged display mode 1", "enlarged display mode 2", and "enlarged display mode off") has been selected. The relationship between the display modes and the scaling ratios will be described later.

The first matrix processing section 17*a* converts the luminance signal DYpk1' and color difference signals DU' an DV' that are output from the first scaling processing section 16*a* into RGB image signals, generates resultant image signals DRpk1, DGpk1, and DBpk1, and outputs the generated image signals to the overlay processing section 18. The second matrix processing section 17*b* converts the luminance signal DYpk2' and color difference signals DU' and DV' that are output from the second scaling processing section 16*b* into RGB image signals, generates resultant image signals DRpk2, DGpk2, and DBpk2, and outputs the generated individual image signals to the overlay processing section 18.

The overlay processing section 18 combines the image signals DRpk1, DGpk1, and DBpk1 that are output from the first matrix processing section 17*a* and the image signals DRpk2, DGpk2, and DBpk2 that are output from the second matrix processing section 17*b* and generates resultant image signals DRpk, DGpk, and DBpk.

When an image composed of the image signals DRpk1, DGpk1, and DBpk1 is denoted by CH1 and an image composed of image signals DRpk2, DGpk2, and DBpk2 is denoted by CH2, the combining process for the image CH1 and the image CH2 by the overlay processing section 18 is performed based on a two-screen combining control signal supplied from the control section 32.

When an area gate signal is input from the control section 32 to the overlay processing section 18, the overlay processing section 18 performs a mask process for the image signal CH2 that is input from the second matrix processing section 17*b*. The area gate signal is a signal that designates the range (position and size) in which the contour correction process is to be performed in the display area on the screen and is generated only when the "image-area-selected contour correction mode" has been selected.

When the mask process is performed by the overlay processing section 18 based on the area gate signal, an image corresponding to the image signal CH2 whose contour has been corrected is output to a designated position on the screen. The values of the two-screen combining control signal and the area gate signal are changed depending on the selected display mode.

The marker adding section 19 overlays a signal that composes the "color-component-extraction-area designation marker" that designates an area from which a color component is extracted, a signal that composes the "contour-correction-valid-area designation marker" that designates an area whose contour correction is to be valid, and so forth with the image signals DRpk, DGpk, and DBpk that are output from the overlay processing section 18. Resultant image signals DRpk', DGpk', and DBpk' are output to the OSD processing section 20.

The OSD processing section 20 performs an OSD process that overlays setting menus, and so forth on an image to be displayed on the display device 22 and displays the resultant overlaid image. The display device drive section 21 generates a drive signal that drives the display device 22 and supplies the drive signal to the display device 22. The display device 22 is composed of a liquid crystal display (LCD) or the like and displays an image based on the drive signal supplied from the display device drive section 21.

The operation section 31 is provided with an interface that includes switches, buttons, knobs, and so forth. An operation signal is generated corresponding to an operation input of the user through the interface and the generated operation signal is supplied to the control section 32. Specifically, the operation section 31 includes a "contour correction mode selection switch" that selects one of the contour correction modes, a "cancel switch" that cancels an operation input, switches that select a setting menu and that enters a selected value, and knobs.

The control section 32 includes a micro processing unit. The control section 32 controls the individual sections of the image capturing apparatus 100. When an operation signal is input from the operation section 31, the control section 32 generates the contour-correction-mode-selection designation signal, the sampling timing control signal, the various designation width setting signals, the peaking level setting signal, the scaling ratio setting signal, the area gate signal, the two-screen combining control signal, the OSD control signal, and so forth corresponding to the an operation signal that is input from the operation section 31 and supplies the generated signals to the foregoing individual sections.

Figure 3:
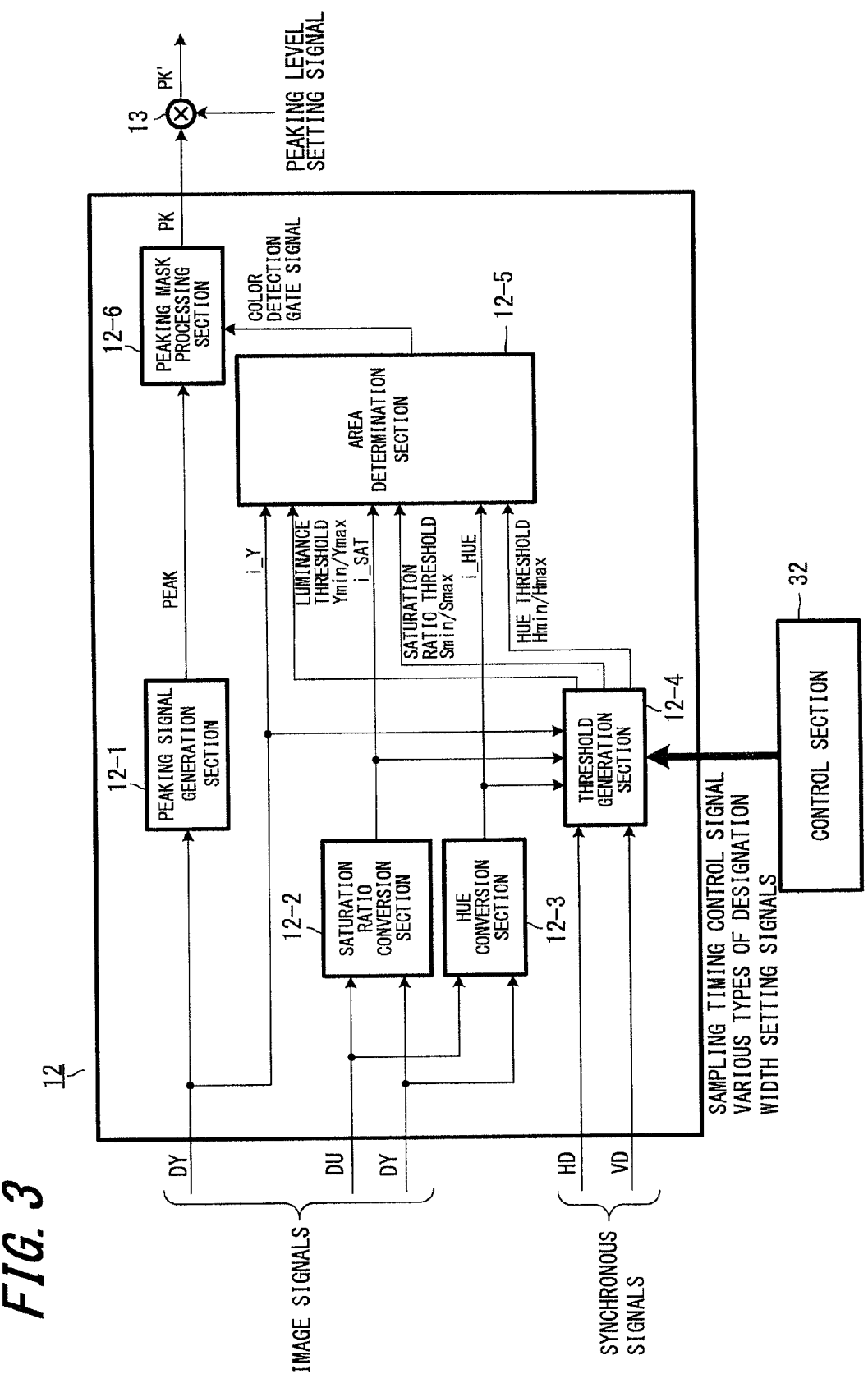
FIG. 3 is a block diagram showing an example of an internal structure of a peaking processing section according to an embodiment of the present invention.

Next, with reference to FIG. 3, details of the structure of the peaking processing section 12 will be described. The peaking processing section 12 shown in FIG. 3 includes a peaking signal generation section 12-1, a saturation ratio conversion section 12-2, a hue conversion section 12-3, a threshold generation section 12-4, an area determination section 12-5, and a peaking mask processing section 12-6.

The peaking signal generation section 12-1 extracts high frequency components from the luminance signal DY, generates a resultant peaking signal PEAK, and outputs the generated peaking signal PEAK to the peaking mask processing section 12-6. The saturation ratio conversion section 12-2 calculates the color difference signals DU and DV that are input from the A/D conversion section 11 (see FIG. 2), generates a resultant saturation ratio conversion value i_SAT, and outputs the obtained saturation ratio conversion value i_SAT to the threshold generation section 12-4 and the area determination section 12-5. Likewise, the hue conversion section 12-3 calculates the color difference signals that are input from the A/D conversion section 11, generates a resultant hue conversion value i_HUE, and outputs the obtained hue conversion value i_HUE to the threshold generation section 12-4 and the area determination section 12-5.

When the threshold generation section 12-4 receives the sampling timing control signal that starts sampling from the control section 32, the threshold generation section 12-4 samples a luminance value i_Y, the saturation ratio conversion value i_SAT, and the hue conversion value i_HUE in a predetermined area in synchronization with a horizontal synchronous signal HD and a vertical synchronous signal VD. The predetermined area is an area that the user designates a "color component extraction area" on the screen. The "color component extraction area" is decided based on the size and position of a "color-component-extraction-area designation marker" displayed on the screen.

When the "standard contour correction mode" has been selected, since an operation that causes sampling of a color component is not performed, the process of the threshold generation section 12-4 is not performed.

Figure 4A:
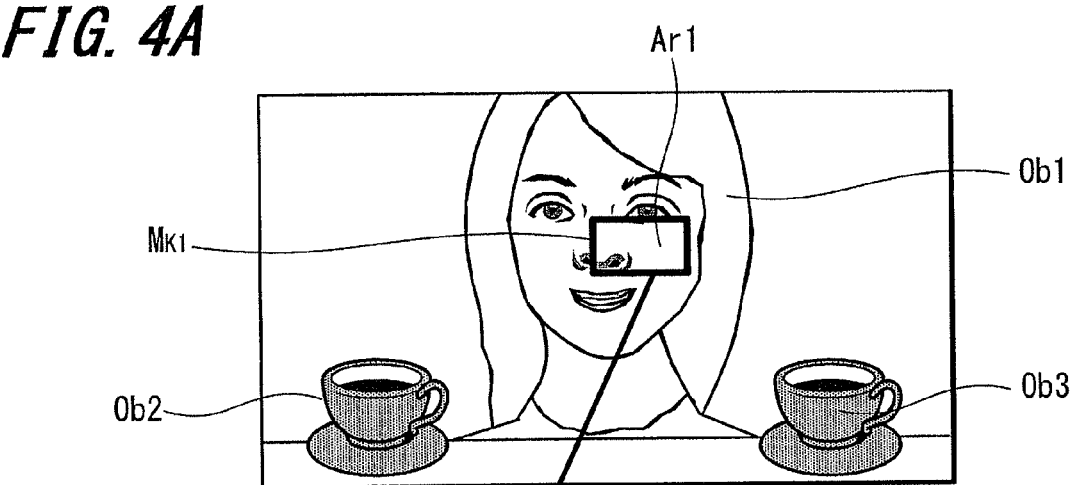
FIGS. 4A, 4B, and 4C are explanatory diagrams that explain a concept of extracting colors according to an embodiment of the present invention, FIG. 4A showing an example of setting a color component extraction area, FIG. 4B showing the relationship of individual sample values and individual designation widths as parameters that generate thresholds, FIG. 4C showing an example of a contour correction valid area.

FIG. 4A shows a display example of a "color-component-extraction-area designation marker". In FIG. 4A, a color-component-extraction-area designation marker Mk1 is displayed at a center portion of the screen. When an operation that confirms this position is accepted from the user, this area becomes a color component extraction area Ar1.

Returning to FIG. 3, the threshold generation section 12-4 obtains average values of individual components using sample values of the luminance value i_Y, sample values of the saturation ratio conversion value i_SAT, and sample values of hue conversion value i_HUE in a predetermined area. The respectively obtained average values are referred to as a luminance sample value, a saturation sample value, and a hue sample value. The threshold generation section 12-4 generates a luminance threshold Ymin, a luminance threshold Ymax, a saturation ratio threshold Smin, a saturation ratio threshold Smax, a hue threshold Hmin, and a hue threshold Hmax based on the obtained luminance sample value, saturation ratio value, and hue sample value. "Min" in each threshold represents a lower limit, whereas "Max" in each threshold represents an upper limit.

The luminance threshold Ymin, luminance threshold Ymax, saturation ratio threshold Smin, saturation ratio threshold Smax, hue threshold Hmin, and hue threshold max are calculated, for example, according to the following formulas.

Luminance threshold $Y$min=luminance sample value−luminance designation width/2

Luminance threshold $Y$max=luminance sample value+luminance designation width/2

Saturation ratio threshold $S$min=saturation sample value−saturation ratio designation width/2

Saturation ratio threshold $S$max=saturation sample value+saturation ratio designation width/2

Hue threshold $H$min=hue sample value−hue designation width/2

Hue threshold $H$max=hue sample value+hue designation width/2

In other words, in each threshold, the threshold max is defined by a value obtained by adding ½ of the setting value to the sample value, whereas the threshold min is defined as a value obtained by subtracting ½ of the setting value from the sample value. In other words, thresholds are defined as values that have widths in the upper and lower directions of a sampling value as a center value. Individual values of "luminance designation width", "saturation ratio designation width", and "hue designation width" are set by the user through the operation section 31. In this embodiment, as a parameter that composes a threshold, an average value of sample values is obtained. Instead, a mode or the like of sample values may be used. In this embodiment, ½ of the designation width is added to or subtracted from the sample value. Instead, a fraction other than ½ of the setting value may be added to or subtracted from the sample value.

The area determination section 12-5 compares the luminance value i_Y that is output from the A/D conversion section 11 (see FIG. 2) with the luminance threshold Ymin and the luminance threshold Ymax generated by the threshold generation section 12-4 to determine whether or not the luminance value i_Y is in the range represented by the luminance threshold Ymin and the luminance threshold Ymax.

Likewise, the saturation ratio conversion section 12-2 compares the saturation ratio conversion value i_SAT that is output from the saturation ratio conversion section 12-2 with the saturation ratio threshold Smin and the saturation ratio threshold Smax that are output from the threshold generation section 12-4. Likewise, the saturation ratio conversion section 12-2 compares the hue conversion value i_HUE that is output from the threshold generation section 12-4 with the saturation ratio threshold Smin and the saturation ratio threshold Smax that are output from the threshold generation section 12-4. Thereafter, the saturation ratio conversion section 12-2 extracts an image signal that has a color component that matches a color space obtained by these thresholds min and thresholds max according to the result of the comparisons and generates a color detection gate signal that gates the extracted image signal. The generated color detection gate signal is output to the peaking mask processing section 12-6.

Thus, when the area determination section 12-5 has not extracted a color component that is present in the range of the color space defined by the thresholds min and the thresholds max or the "color-selected contour correction mode 1" has not been selected as a contour correction mode, the area determination section 12-5 does not generate the color detection gate signal.

When the peaking mask processing section 12-6 has input the color detection gate signal from the area determination section 12-5, the peaking mask processing section 12-6 performs a mask process for the peaking signal PEAK that is input from the peaking signal generation section 12-1 based on the color detection signal and outputs a resultant peaking signal PK to the multiplying device 13.

In other words, the peaking signal PK generated in the peaking mask processing section 12-6 becomes a signal that emphasizes (corrects) the contour of the image signal containing a predetermined color component in the image area. The area in which the contour is emphasized with the peaking signal PK is displayed as a contour correction valid area on the screen.

Figure 4B:
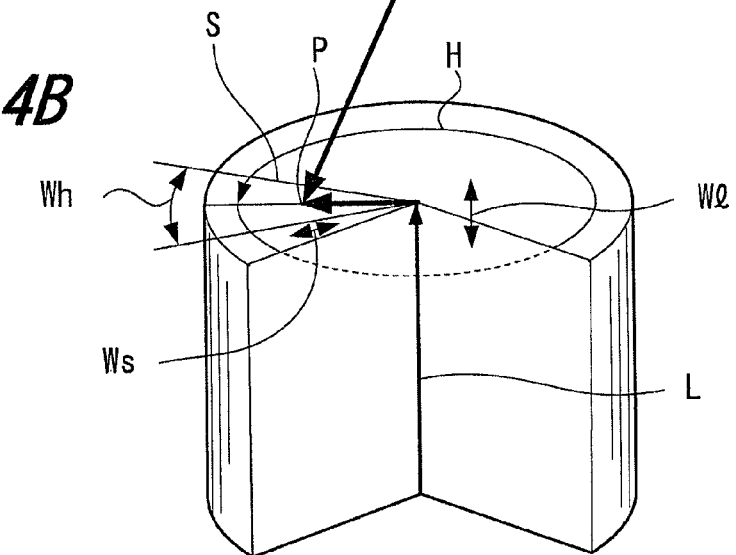
Figure 4C:
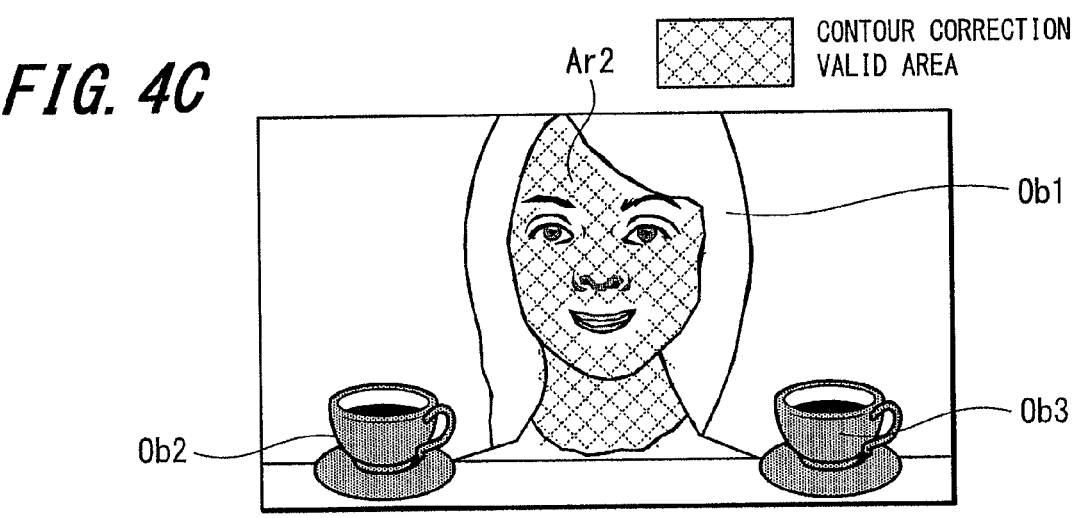

FIG. 4A to FIG. 4C are schematic diagrams describing the concept of color component extraction of this embodiment. FIG. 4A shows that an object Ob1 (female), an object Ob2 (coffee cup), and an object Ob3 (coffee cup) are displayed on the screen of the viewfinder section 60. The color-component-extraction-area designation marker Mk1 is displayed on the face of the object Ob1. In this embodiment, it is assumed that an area represented by the color-component-extraction-area designation marker Mk1 is confirmed as the color component extraction area Ar1 by the user.

FIG. 4B shows a color space model composed of three components luminance, hue, and saturation. In this drawing, the upper and lower directions of the axis of the cylinder represent the values of the luminance, the direction of the distance from the axis represents the value of the saturation ratio, and the angle of the circumference represents the value of the hue. Thus, in FIG. 4B, the height of the cylinder represents a luminance sample value L, the length of an arrow extending from the axis toward the outside represents a saturation sample value S, and the rotation angle in the circumferential direction represents a hue sample value H.

In FIG. 4B, a position defined by the luminance sample value L, the saturation sample value S, and the hue sample value H is represented by a point P. In other words, a color component extracted in the color component extraction area Ar1 shown in FIG. 4A is represented as the point P on the cylinder shown in FIG. 4B.

In FIG. 4B, a luminance designation width W1, a saturation ratio designation width Ws, and a hue designation width Wh are represented by lengths of arrows. The values of the individual designation widths are used as parameters that calculate the thresholds min and the thresholds max of the individual components. By increasing or decreasing the values, the widths of the thresholds can be changed.

A color space having a width of ½ of a designation width in each of the increasing and decreasing directions around the point P is a color space defined by the threshold min and threshold max. The contour correction process is performed only for an image area that matches this color space. This image area is represented as a contour correction valid area Ar2 on the screen.

In FIG. 4C, the contour correction valid area Ar2 is shaded. Since the contour correction is performed only for the area represented by the contour correction valid area Ar2, the contour correction process is not performed for the object Ob2, the object Ob3, and the background having color components that are different from the color component extracted in FIG. 4A.

Since the threshold min and the threshold max and the various setting values have the above-described relationship, if the range of the contour correction valid area Ar2 is intended to be widened, the user is necessary to set larger values as the various designation widths. In contrast, when the range of the contour correction valid area Ar2 is intended to be narrowed, the user is necessary to set smaller values as the various designation widths.

In FIG. 4A, since the color component extraction area Ar1 has been set at the position of the face of the object, a skin color component has been extracted. When the user sets smaller values as the luminance designation width W1, the saturation ratio designation width Ws, and the hue designation width Wh, the range of the color space that matches the thresholds becomes narrow. In other words, the range of the contour correction valid area Ar2 is limited to an image area having a color component equal to the extracted skin color component.

FIG. 5A shows a display example in such a case. The range of the contour correction valid area Ar2 shown in FIG. 5A is narrower than the range of the contour correction valid area Ar2 shown in FIG. 4C. FIG. 5B shows a display example in which after it has been checked that the contour correction valid area Ar2 is in the range shown in FIG. 4C, larger values are set as the luminance designation width W1, saturation ratio designation width Ws, and hue setting value Wh. It is clear that the range of the contour correction valid area Ar2 shown in FIG. 5B is larger than the range of the contour correction valid area Ar2 shown in FIG. 4C. In FIG. 5B, since the background portion other than the object Ob1 has a color component close to the skin color of the object Ob1, the background area is set as the contour correction valid area Ar2.

Figure 6:
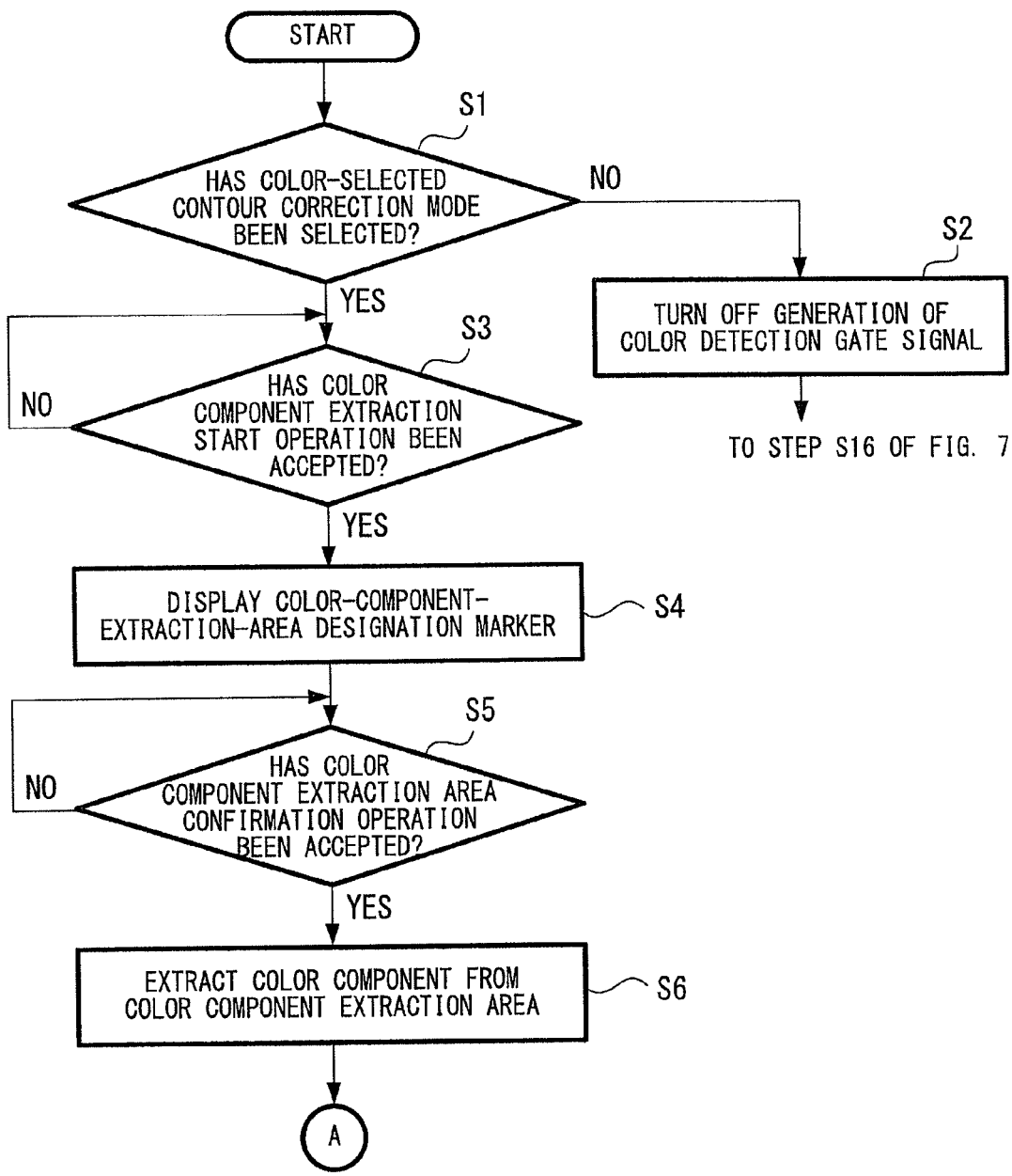
FIG. 6 is a flowchart showing an example of a process performed when a color-selected contour correction mode according to an embodiment of the present invention is selected.

Next, with reference to flowcharts shown in FIG. 6 and FIG. 7, an example of a process of the peaking processing section 12 will be described. In FIG. 6, it is determined whether or not the "color-selected contour correction mode" has been set as the contour correction mode (at step S1).

When the determined result denotes that the "color-selected contour correction mode" has been selected, it is determined whether or not a color component extraction start operation has been accepted from the user (at step S3). When the color component extraction start operation has been accepted, a process of displaying the color-component-extraction-area designation marker Mk1 on the display device 22 (see FIG. 2) is performed (at step S4). If the color component extraction start operation is not performed, a process of generating individual thresholds based on a color component that has been extracted last time (or an initial value) is performed (at step S12 shown in FIG. 7).

It is determined whether or not the area surrounded by the color-component-extraction-area designation marker Mk1 has been confirmed by the user (at step S5). When the determined result denotes that the area has been confirmed by the user, a color component of the color component extraction area Ar1 is extracted (at step S6). Other steps preceded by the color component extraction step will be described with reference to the flowchart shown in FIG. 7.

Figure 7:
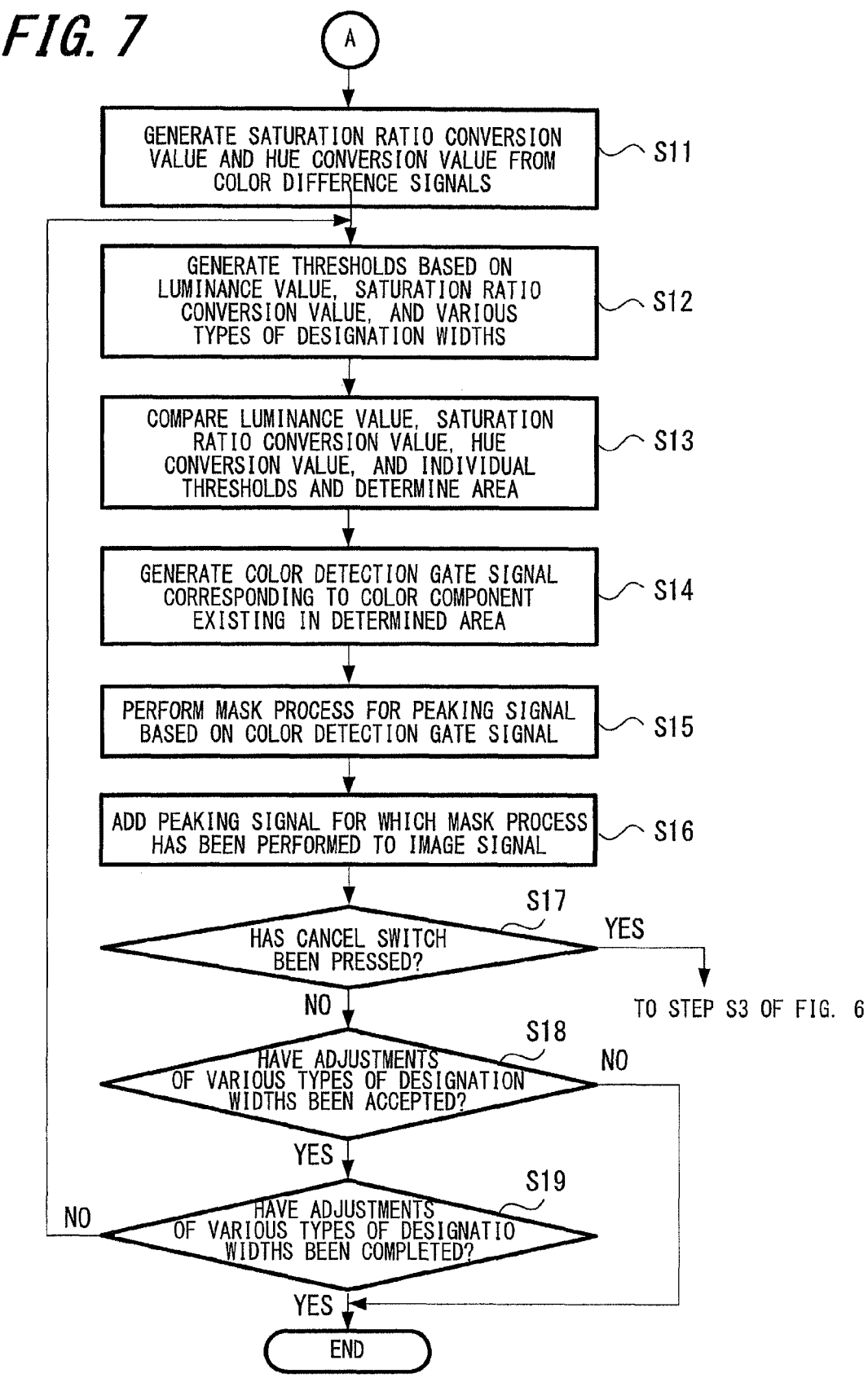
FIG. 7 is a flowchart showing an example of a process performed when the color-selected contour correction mode according to an embodiment of the present invention is selected.

In FIG. 7, the saturation ratio conversion value i_SAT is generated by the saturation ratio conversion section 12-2 and the hue conversion value i_HUE is generated by the hue conversion section 12-3 based on the color difference signals extracted from the image signal. The luminance threshold Ymin and luminance threshold Ymax, the saturation ratio threshold Smin and saturation ratio threshold Smax, and the hue threshold Hmin and hue threshold Hmax are generated by the threshold generation section 12-4 based on the luminance value i_Y that is output from the A/D conversion section 11 (see FIG. 2), the saturation ratio conversion value i_SAT that is output from the saturation ratio conversion section 12-2, and the hue conversion value i_HUE that is output from the hue conversion section 12-3 (at step S12).

Thereafter, the luminance value i_Y extracted from the color component extraction area Ar1, the luminance threshold Ymin, and the luminance threshold Ymax, the saturation ratio conversion value i_SAT, the saturation ratio threshold Smin, and the saturation ratio threshold Smax, and the hue conversion value i_HUE, the hue threshold Hmin, and the hue threshold Hmax are compared by the threshold generation section 12-4. An area containing a particular color component is determined based on the compared results (at step S13).

After the area has been determined, a color detection gate signal corresponding to a color component existing in the area is generated by the threshold generation section 12-4 (at step S14). The generated color detection gate signal is output to the peaking mask processing section 12-6 (see FIG. 3). The peaking mask processing section 12-6 performs a mask process for the PEAK signal that is output from the peaking signal generation section 12-1 based on the input color detection gate signal and outputs the peaking signal PK for which the mask process has been performed (at step S15).

The luminance signal DY and the peaking signal PK are added by the adding device 14 (or adding device 15) (see FIG. 2) (at step S16). In other words, the peaking process is performed only for a predetermined color space of the image signal.

In contrast, when the determined result at step S1 shown in FIG. 6 denotes that the "color-selected contour correction mode" has not been selected, namely the "standard contour correction mode" has been set, the generation of the color detection gate signal in the area determination section 12-5 is turned off (at step S2). In other words, the color detection gate signal is not output to the peaking mask processing section 12-6. Thus, the peaking mask processing section 12-6 does not perform the mask process. In this case, the peaking signal PEAK generated by the peaking signal generation section 12-1 is output as the peaking signal PK. The adding device 14 (see FIG. 2) adds the luminance signal DY and the peaking signal PK (at step S16).

Figure 8:
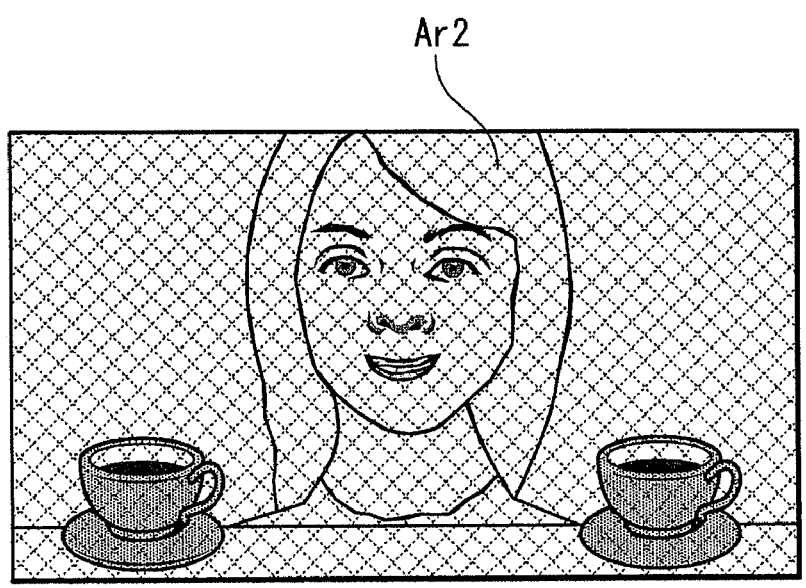
FIG. 8 is an explanatory diagram showing a display example of the contour correction valid area when a standard contour correction mode according to an embodiment of the present invention is selected.

In this case, the range in which the contour is emphasized by the peaking signal PK (=peaking signal PEAK) is as shown in FIG. 8. In FIG. 8, the contour correction valid area Ar2 is hatched and the entire screen. In other words, if the color detection gate signal is not generated by the area determination section 12-5, like the process of the related art, the peaking process is performed for all image signals from which high frequency components are detected.

Returning to the flowchart of FIG. 7, at step S17, it is determined whether or not a cancel switch input operation has been accepted from the user. When the cancel switch input operation has been accepted, the flow returns to step S3 of FIG. 6 and the process is continued.

When the determined result denotes that the cancel switch input operation has not been accepted, it is determined whether or not adjustments of various designation widths (luminance designation width W1, saturation ratio designation width Ws, and hue designation width Wh) have been accepted (at step S18). When the user has adjusted the various setting values, the flow returns to step S12 and the process is continued. In other words, the threshold min and the threshold max of each component are re-calculated by the threshold generation section 12-4 based on the various designation width values that the user has newly set. When the determined result at step S19 denotes that the adjustments of the various setting values have been completed, the process is competed. In contrast, when the determined result at step S18 denotes that the adjustments of the various designation widths have not been performed, the process is also completed.

Figure 9:
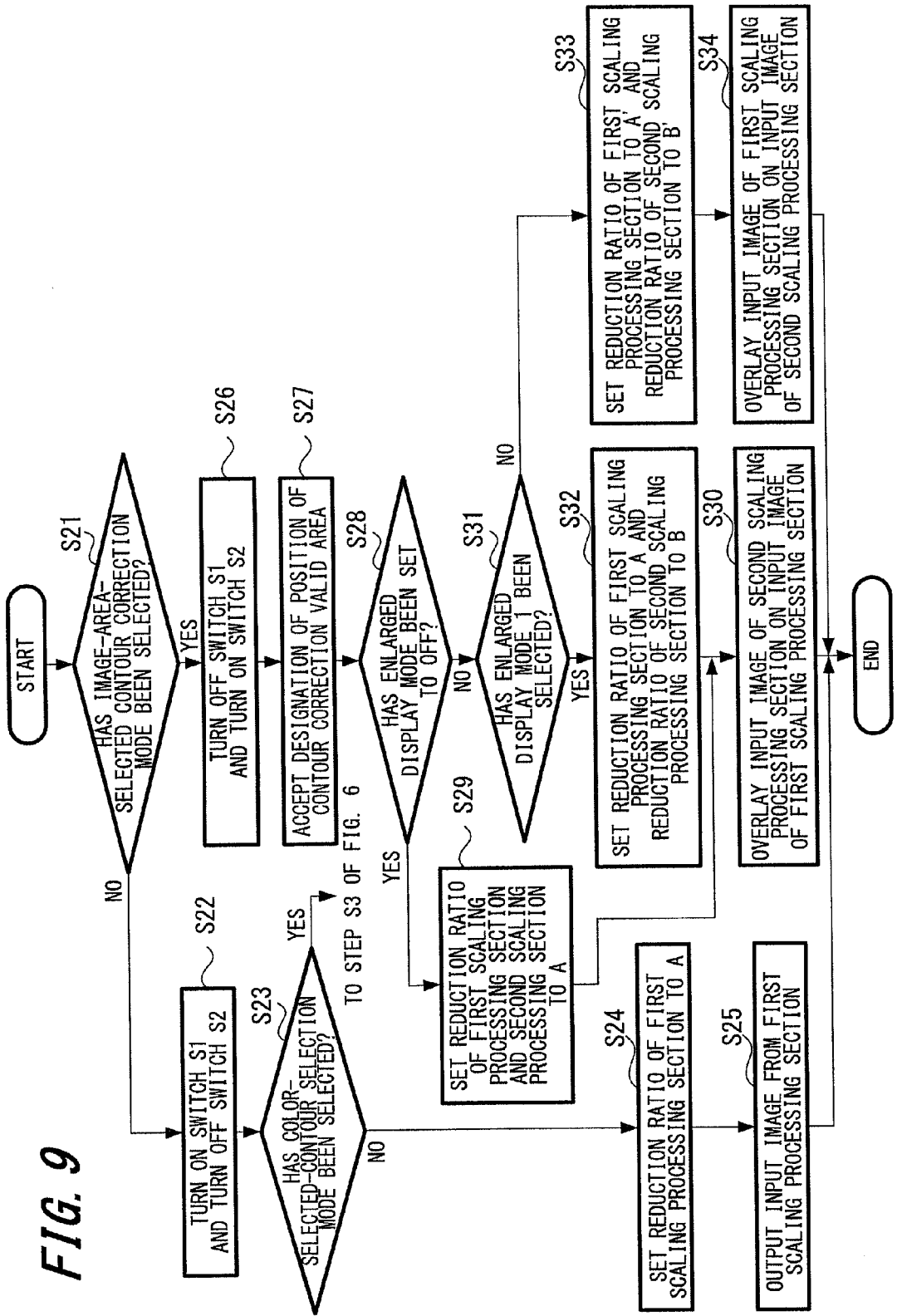
FIG. 9 is a flowchart showing an example of a process performed when an image-area-selected contour correction mode according to an embodiment of the present invention is selected.

Next, with reference to a flowchart shown in FIG. 9, a process performed after the peaking signal PK' is output from the multiplying device 13 (see FIG. 2) will be described. In FIG. 9, it is determined whether or not the contour correction mode has been set as the "image-area-selected contour correction mode" (at step S21).

When the determined result denotes that the "image-area-selected contour correction mode" has not been selected, the switch Sw1 (see FIG. 2) is turned on and the switch Sw2 is turned off under the control of the control section 32 (at step S22).

When the switch Sw1 has been set to on at step S22, the peaking signal PK' whose level has been set by the multiplying device 13 is added to the luminance signal DY by the adding device 14. The luminance signal DYpk1 to which the peaking signal PK' has been added and the color difference signals DU and DV are input to the first scaling processing section 16a. When the switch Sw2 is turned off, the peaking signal PK' is not output to the adding device 15 to which the switch Sw2 is connected. Thus, the luminance signal DYpk2 to which the peaking signal PK' has not been added and the color difference signals DU and DV are input to the second scaling processing section 16b to which the adding device 15 is connected.

When the "color-selected contour correction mode" has not been selected, the luminance signal DYpk1 that is input to the first scaling processing section 16a is a signal that is generated by adding the peaking signal PK' to all image signals having high frequency components. When the "color selection contour correction mode" has been selected, the luminance signal DYpk1 that is input to the first scaling processing section 16a is a signal that is generated by adding the peaking signal PK' to an image signal containing high frequency components and predetermined color components.

Thereafter, the flow advances to step S24. At step S24, the first scaling processing section 16a sets the reduction ratio (scaling ratio) to "A" and performs a pixel conversion process. It is assumed that the value of "A" has been set to a value, for example, obtained by dividing the resolution of the display device 22 (see FIG. 2) by the resolution of the input image signal. If the resolution of the display device 22 is the half of the resolution of the input image signal, the reduction ratio A is set to 0.5. In other words, at step S24, a process of reducing an image according to the number of pixels of the display device 22 is performed.

An image signal CH1 for which the pixel conversion process and if necessary the i/p conversion process have been performed by the first scaling processing section 16a and an image signal CH2 for which the similar processes have been performed by the second scaling processing section 16b are output to the overlay processing section 18 through the first matrix processing section 17a and the second matrix processing section 17b, respectively. Only the image signal CH1 is output from the overlay processing section 18 based on a two-screen combining control signal that is input from the control section 32.

In other words, if the "image-area-selected contour correction mode" has not been selected, the control section 32 supplies the two-screen combining control signal to the overlay processing section 18 to cause it to output only the image signal CH1. Instead, if the "image-area-selected contour correction mode" has not been selected, the system may be structured such that an image signal is not output to the second scaling processing section 16b. Instead, the system may be structured such that the "image-area-selected contour correction mode" is not provided. In this case, each of a scaling processing section 16 and a matrix processing section 17 may have a single processing system. In other words, the system may be structured such that only the image signal CH1 is output from the image processing section 30.

The image signal CH1 that is output from the overlay processing section 18 is displayed on the display device 22 through the marker adding section 19, the OSD processing section 20, and the display device drive section 21. The image signal CH1 is a signal generated based on the luminance signal DYp1. When the "color-selected contour correction mode" has not been selected, the luminance signal DYpk1 is a signal generated by adding the peaking signal PK' to all image signals having high frequency components. In contrast, when the "color-selected contour correction mode" has not been selected, the luminance signal DYpk1 is a signal generated by adding the peaking signal PK' to an image signal having high frequency components and predetermined color components. Thus, if neither the "image-area-selected contour correction mode", nor the "color-selected contour correction mode" has not been selected, namely the "standard contour correction mode" has been selected, a display image according to the image signal CH1 is displayed as shown in FIG. 8. In other words, the contour correction valid area Ar2 extends to the entire screen.

When the determined result at step S21 shown in FIG. 9 denotes that the "image-area-selected contour correction mode" has been selected, the switch Sw1 is turned off and the switch Sw2 is turned on (at step S26). In other words, the peaking signal PK' whose level has been set by the multiplying device 13 is not output to the adding device 14 to which the switch Sw1 is connected, but only to the adding device 15 to which the switch Sw2 is connected.

Since the peaking signal PK' is not input to the adding device 14, the luminance signal DY that is output from the A/D conversion section 11 (see FIG. 2) is output as the luminance signal DYpk1 to the first scaling processing section 16a. In other words, the luminance signal DYpk1 for which the contour correction process has not been performed is input to the first scaling processing section 16a.

On the other hand, since the peaking signal PK' is input to the adding device 15 through the switch Sw2, the luminance signal DYpk2 generated by adding the luminance signal DY and the peaking signal PK' is input from the adding device 15 to the second scaling processing section 16b. In other words, the luminance signal DYpk2 for which the contour correction process has been performed is input to the second scaling processing section 16b.

Figure 10:
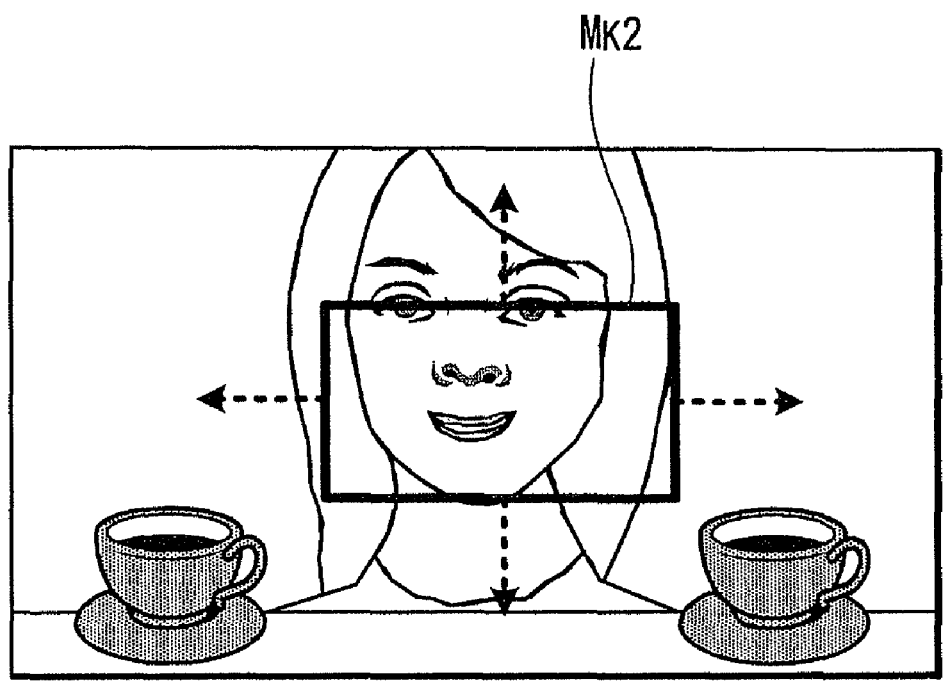
FIG. 10 is an explanatory diagram showing a display example of the contour correction valid area according to an embodiment of the present invention.

Thereafter, an operation that designates the position and the size of the contour correction valid area Ar2 is accepted from the user (at step S27). FIG. 10 shows an example of a graphical user interface (GUI) that designates the contour correction valid area Ar2. FIG. 10 shows that a contour correction valid area designation marker Mk2 is displayed at a center portion of the screen. The position and size of the contour correction valid area designation marker Mk2 are structured to be freely changed by the user.

After the contour correction valid area Ar2 is decided with the contour correction valid area designation marker Mk2 shown in FIG. 10, it is determined whether or not the "enlarged display mode" has been set to off (at step S28). When the "enlarged display mode" has been set to off, the screen ratio of both the first scaling processing section 16a and the second scaling processing section 16b is set to "A" (at step S29). The overlay processing section 18 combines the image CH2 that has been input from the first scaling processing section 16a and for which the mask process has been performed on the image CH1 that has been input from the first scaling processing section 16a (at step S30).

FIG. 11A shows a display example in which the "image-area-selected contour correction mode" has been selected and the "enlarged display mode" has been set to off. FIG. 11A shows that a contour correction valid area Ar2 is overlaid on an image CH displayed on the entire screen. In addition, FIG. 11A shows that an image displayed in the contour correction valid area Ar2 is an input image CH2 received from the second scaling processing section 16b.

In other words, when the "image-area-selected contour correction mode" has been selected and the "enlarged display mode" has been set to off, the contour correction process is performed only for the contour correction valid area Ar2 identified with the contour correction valid area designation marker Mk2. The peaking process is not performed for an image signal displayed in the other area (where the image CH1 is displayed).

When the determined result at step S28 of FIG. 9 denotes that the "enlarged display mode" has been set to on, it is determined whether or not "enlarged display mode 1", has been selected (at step S31). When the "enlarged display mode 1" has been selected, the scaling ratio of the first scaling processing section 16a is set to "A'" and the scaling ratio of the second scaling processing section 16b is set to "B'" (at step S32).

It is assumed that the scaling ratio B is larger than the scaling ratio A and has been set to a value that is 1 or smaller. If the scaling ratio A has been set to 0.5, the value of the scaling ratio B has been set to, for example, 0.8. If the scaling ratio B is 1, the second scaling processing section 16b does not perform the scaling process. If necessary, the second scaling processing section 16b performs the i/p conversion process. The overlay processing section 18 overlays the image CH2 that has been input from the second scaling processing section 16b and for which the mask process has been performed on the image CH1 that has been input from the first scaling processing section 16a (at step S29).

FIG. 11B shows a display example in which the "image-area-selected contour correction mode" has been selected and the "enlarged display mode 1" has been selected. FIG. 11B shows the state in which the contour correction valid area Ar2 has been enlarged and overlaid on the input image CH1 received from the first scaling processing section 16a and displayed on the entire screen. In addition, FIG. 11B shows that the image displayed in the contour correction valid area Ar2 is the output image CH2 of the second scaling processing section 16b.

In other words, when the "image-area-selected contour correction mode" has been selected and the "enlarged display mode 1" has been selected, the contour correction process is performed only for the contour correction valid area Ar2 that has been identified with the contour correction valid area designation marker Mk2 and the contour correction valid area Ar2 is enlarged and displayed. The peaking process is not performed for image signals displayed in the other areas.

Since an image displayed in the contour correction valid area Ar2 is enlarged, the resolution of an object for which focus adjustment is to be performed is improved. Thus, the user can more easily adjust focusing. In addition, since a regular image for which the peaking process has not been performed is displayed in the background of the contour correction valid area Ar2 on the entire screen, the layout can be checked in addition to the adjustment of focusing.

The enlargement ratio of an image display in the contour correction valid area Ar2 depends on the scaling ratio B that is set by the second scaling processing section 16b at step S32. Thus, if the user wants to change the enlargement ratio of a target area for which focus adjustment is to be performed, by setting the value of the reduction ratio B in the range of $1 \geq B > A$, the display size of the contour correction valid area Ar2 in which the peaking process is performed can be changed.

When the determined result at step S31 of FIG. 9 denotes that the "enlarged display mode 1" has not been selected, namely the "enlarged display mode 2" has been selected, the scaling ratio of the first scaling processing section 16a is set to "A'" and the scaling ratio of the second scaling processing section 16b is set to "B'" (at step S33). Now, it is assumed that the scaling ratio A' has been set to a value smaller than the scaling ratio A and that the scaling ratio B' is set to a value that is larger than the scaling ratio A and that is 1 or smaller. The overlay processing section 18 overlays the image CH1 that is input from the first scaling processing section 16a on the image CH2 that has been input from the second scaling processing section 16b and for which the mask process has been performed (at step S34).

FIG. 11C shows a display example in which the "image-area-selected contour correction mode" has been selected and the "enlarged display mode 2" has been selected. Unlike in the display examples of FIG. 11A and FIG. 11B, in FIG. 11C, the input image CH2 received from the second scaling processing section 16b is displayed on the entire screen and is overlaid with the image CH1 that is input from the first scaling processing section 16a.

In other words, when the "image-area-selected contour correction mode" has been selected and the "enlarged display mode 2" has been selected, the contour correction valid area Ar2 is displayed on the entire screen and the image CH1 whose contour has not been corrected is displayed in a reduced size at a predetermined position, for example, at the lower right end of the screen.

In the "enlarged display mode 2", since the user can enlarge the contour correction valid area Ar2 to display it on the entire screen, he or she can more easily adjust focusing. In addition, since a composition check image can be displayed on a child screen, the user can perform both the focus adjustment and the composition check at the same time.

According to the foregoing embodiment, a range in which the peaking process is performed can be identified with a color component contained in an image signal and an area on the display screen. In addition, since the peaking process is not performed in other than the identified area, the peaking process can be prevented from being performed in an area for which contour correction is not to be performed.

In this case, since contour correction can be performed only for an area associated with an object for which focus adjustment is to be performed, the user can easily adjust focusing.

In addition, according to the foregoing embodiment, a range in which contour correction is to be performed is decided based on the sizes and positions of the "color-component-extraction-area designation marker Mk1" and the "contour correction valid area designation marker Mk2" displayed on the screen. Thus, by changing the sizes and positions of these markers, the user can easily set a range in which contour correction is to be performed.

In addition, when the "color-selected-contour correction mode" has been selected, the peaking process is performed only for objects having a color component contained in a particular area selected by the user and objects having a color component contained in a color space similar to the color component contained in the particular area selected by the user. Thus, the user can easily adjust focusing of a particular object.

In this case, since contours of various color objects displayed in various image areas can be selectively corrected, focusing of a selected particular object can be easily adjusted.

In a frame or the like where there are a plurality of persons as objects, only by designating a skin portion or the like of one of these persons, the contour correction process is performed for the entire image space having a color component similar to the color component of the designated skin portion. In other words, the contours of (only skin color portions) of all the objects can be corrected without necessity of individually identifying the plurality of objects. With such a display, focusing of only persons as objects can be easily adjusted.

On the other hand, when the "color-selected contour correction mode" has been selected, two values of an upper limit value (max) and a lower limit value (min) are provided as thresholds used to match a color component contained in an area designated by the user with a color component contained in an image signal. Thus, contours of not only an area having a color component that completely matches a color component contained in an area designated by the user, but an area having a color component similar thereto are corrected.

In this case, since the values of the luminance designation width W1, the saturation ratio designation width Ws, and the hue setting value Wh used as parameters when threshold values are calculated can be freely set by the user, by increasing and decreasing these designation widths, he or she can freely adjust the range of an area whose contour is to be corrected.

In addition, when the values of these designation widths are changed, thresholds are set with the values of the designation widths that have been newly set and the contour correction valid area Ar2 is set again based on these thresholds. As a result, the user can adjust an area for which the peaking process is to be performed with a visible/sensible operation.

On the other hand, when the "image-area-selected contour correction mode" has been selected, the contour correction process is performed only for an area designated as the contour correction valid area Ar2 by the user. Thus, by designating such an area, the user can easily identify a target for which focus adjustment is to be performed.

When the "enlarged display mode 1" or the "enlarged display mode 2" is selected, an image in an area in which contour correction is valid is displayed in an enlarged size, the user can easily adjust focusing while checking a more detail portion in an image of the contour correction valid area Ar2.

In addition, in any of these enlarged display modes, along with an image for which the contour correction process has been performed and for which focus adjustment is to be performed, a regular image for which the peaking process has not been performed is displayed. Thus, the user can adjust focusing while checking for a composition.

In other words, the user can selectively use modes depending on whether he or she wants to display in an enlarged size an area for which focus adjustment is to be performed or an area for checking a composition.

The three modes "color-selected contour correction mode", "image-area-selected contour correction mode", and "standard contour correction mode" in which neither of the contour correction modes is selected have been prepared. Thus, if the user is not necessary to set a range in which the peaking process is to be performed, he or she can select the "standard contour correction mode". In other words, the user can select these modes depending on his or her purpose.

In the foregoing embodiment, a structure of which any one of the three contour correction modes can be used is exemplified. Instead, a structure of which both the modes "color-selected contour correction mode" and "image-area-selected contour correction mode" can be used simultaneously may be applied.

FIG. 12A and FIG. 12B show the state that an object Ob1 as a target for which focus adjustment is to be performed and an object Ob4 having a color component similar to that of the object Ob1 co-exist on a screen. FIG. 12A shows a display example in which the color-selected contour correction mode has been selected on such a screen.

When the contour correction valid area Ar2 has been decided in the "color-selected contour correction mode", as shown in FIG. 12A, not only the object Ob1 as a target for which focus adjustment is to be performed, but the object Ob4 are included in the range of the contour correction valid area Ar2. In other words, the contour of the object Ob4 that is not necessary to be performed for the peaking process is corrected.

In such a case, when the "image-area-selected contour correction mode" is selected and the size and position of the contour correction valid area Ar2 are reduced only to the area of the object Ob1, the target for contour correction is to be performed can be limited to only the object Ob1.

FIG. 12B shows a display example in such a case. FIG. 12B shows the state in which the contour correction valid area Ar2 is reduced to only the vicinity of the face of the object Ob1. This operation allows a target for contour correction to be limited to an image area having a predetermined color component in the contour correction valid area Ar2.

In other words, when the "color-selected contour correction mode" and the "image-area-selected contour correction mode" are used in combination, even if an object for which focus adjustment is not to be performed has a color component similar to that of the object for which focus adjustment is to be performed, the object for which focus adjustment is not to be performed can be removed from the target area for contour correction.

Figure 13:
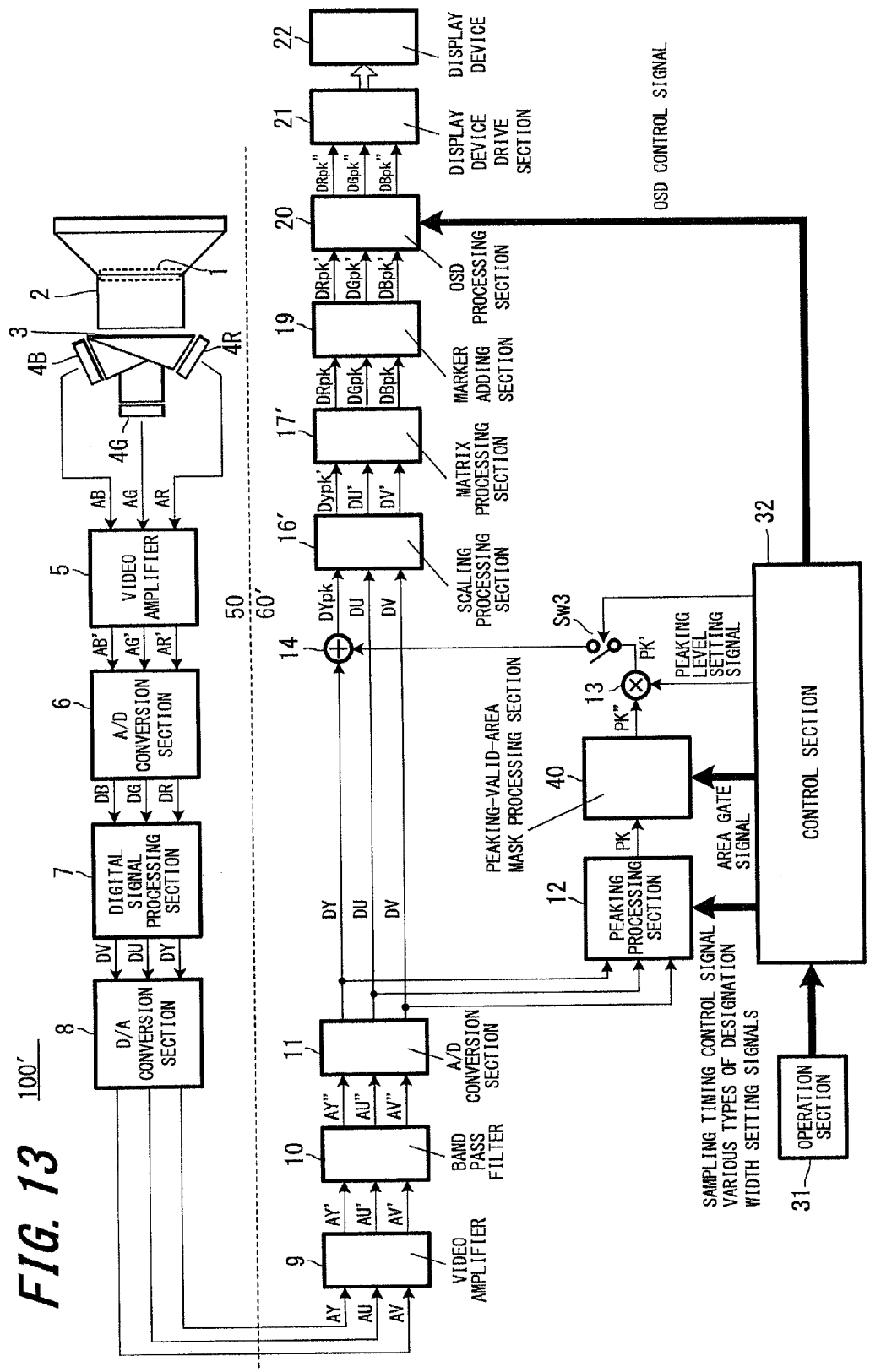
FIG. 13 is a block diagram showing an example of an internal structure of an image capturing apparatus according to another embodiment of the present invention.

In the foregoing embodiment, a structure of which one image capturing apparatus has three contour correction modes and three enlarged display modes was exemplified. Instead, the image capturing apparatus may not have enlarged display modes. FIG. 13 shows a block diagram in such a structure. In FIG. 13, similar sections are denoted by corresponding reference numerals and their detailed description will be omitted.

In an image capturing apparatus 100' shown in FIG. 13, a viewfinder section 60' has one scaling processing section 16' and one matrix processing section 17'. Thus, the image capturing apparatus 100' is not necessary to provide an overlay processing section that combines images processed by two processing systems. Instead, the image capturing apparatus 100' is provided with a peaking-valid-area mask processing section 40 that performs a mask process for the peaking signal PK that is output from the peaking processing section 12.

The peaking-valid-area mask processing section 40 performs the mask process for the peaking signal that is input from the peaking processing section 12 using an area gate signal when it is supplied from the control section 32. The area gate signal is generated in the control section 32 corresponding to position information of the contour correction valid area Ar2 designated by the user. Since the mask process is performed for the peaking signal PK using the area gate signal, the contour correction process is performed only for an image having high frequency components in the area designated by the user.

Figure 14:
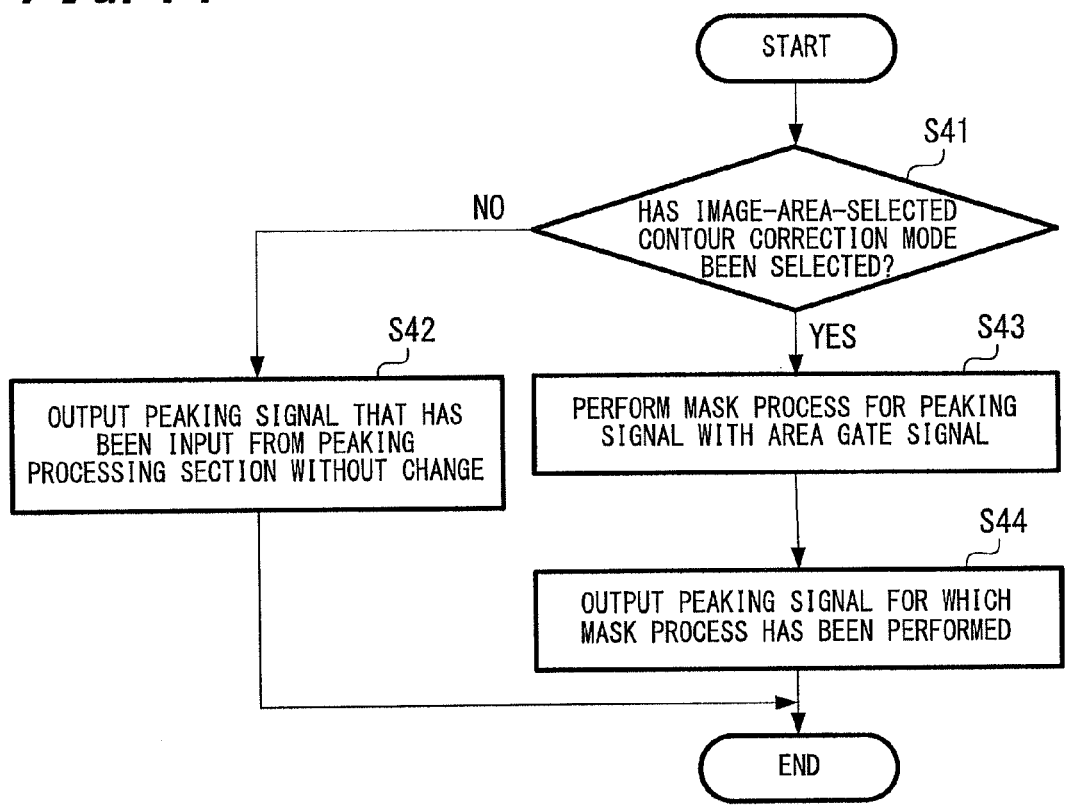
FIG. 14 is a flowchart showing an example of a process of a peaking-valid-area mask processing section according to another embodiment of the present invention.

FIG. 14 is a flowchart showing an example of a process of the peaking-valid-area mask processing section 40. First, it is determined whether or not the "image-area-selected contour correction mode" has been selected (at step S41). When the "image-area-selected contour correction mode" has not been selected, namely the "color-selected contour correction mode" or "standard contour correction mode" has been selected, a process of directly outputting the peaking signal that is input from the peaking processing section 12 is performed (at step S42).

In other words, if the "color-selected contour correction mode" or "standard contour correction mode" has been selected, since the control section 32 does not supply the area gate signal, the peaking-valid-area mask processing section 40 does not perform the mask process.

When the determined result at step S41 denotes that the "image-area-selected contour correction mode" has been selected, a process of masking the peaking signal PK that is output from the peaking processing section 12 using the area gate signal supplied from the control section 32 is performed (at step S43). Thereafter, a peaking signal PK" for which the mask process has been performed is output to the multiplying device 13 (at step S44).

The multiplying device 13 multiplies the peaking signal PK" for which the mask process has been performed by the peaking level setting signal supplied from the control section 32 and generates a peaking signal PK'. The peaking signal PK' whose peaking level has been adjusted is output to the adding device 14 and the adding device 14 adds the peaking signal PK' and the luminance signal DY.

In the image capturing apparatus 100' shown in FIG. 13, when a process is performed in the "color-selected contour correction mode" in addition to the "image-area-selected contour correction mode", the peaking signal PK that is input to the peaking-valid-area mask processing section 40 is a signal in which a particular color space has been gated. Since the mask process is performed for the peaking signal PK using the area gate signal by the peaking-valid-area mask processing section 40, the target for the peaking process is limited to only an object having a color component designated by the user in an image area designated by him or her.

In this structure, the circuit structure can be simplified in comparison with that of the embodiment shown in FIG. 2. In addition, the range in which the contour correction process is to be performed can be decided according to a contour correction mode selected by the user.

The foregoing embodiment is applied to an example in which the image capturing apparatus 100 (100') has the viewfinder section 60 (60'). Instead, the foregoing embodiment may be applied to a structure that does not have the viewfinder section 60 (60'). In other words, the foregoing embodiment may be applied to an image capturing apparatus that outputs an image signal to an external display apparatus through an output terminal or the like. Instead, the foregoing embodiment may be applied to an image signal processing apparatus that is not provided with the camera section 50 and that processes an image signal that is input from an external image capturing apparatus.

The present application contains subject matter related to that disclosed in Japanese Priority Patent Application JP 2008-071706 filed in the Japanese Patent Office on Mar. 19, 2008, the entire content of which is hereby incorporated by reference.

It should be understood by those skilled in the art that various modifications, combinations, sub-combinations and alternations may occur depending on design requirements and other factors insofar as they are within the scope of the appended claims or the equivalents thereof.

What is claimed is:

1. An image signal processing apparatus, comprising:
   a peaking signal generation section configured to extract and amplify high frequency components contained in an input image signal to generate a peaking signal;
   an operation section configured to allow a target area for which contour correction is to be performed using the peaking signal to be accepted;
   a control section configured to generate an area gate signal describing position information corresponding to the designated target area; and
   a mask processing section configured to perform a mask process of outputting an image signal to which the peaking signal has been added to the target area designated through the operation section based on the area gate signal supplied from the control section; and
   a scaling processing section configured to convert pixels of the image signal for which the mask process has been performed is converted at a predetermined scaling ratio,
   wherein when the image signal for which the contour correction has been performed has been caused to be displayed in an enlarged size through the operation section, a value of the scaling ratio applied to the image signal that is output to the designated target area is caused to be larger than a value of a scaling ratio applied to an image signal that is output to other than the designated target area.

2. The image signal processing apparatus as set forth in claim 1, further comprising:
   an area determination section configured to generate a color detection gate signal to gate an image signal having a color space that matches a second color space defined based on a color component contained in the target area designated through the operation section in a first color space composed of color components that the input image signal has; and
   a peaking mask processing section configured to perform a mask process for the peaking signal generated in the peaking signal generation section based on the color detection gate signal generated in the area determination section.

3. The image signal processing apparatus as set forth in claim 2, further comprising:
   a threshold generation section configured to extract color components from the designated target area and generate a threshold that defines the second color area based on the extracted color components and a designation width that has been designated in advance.

4. The image signal processing apparatus as set forth in claim 3,
   wherein the threshold generation section is configured to add and subtract a half value of the designation value to and from an average value of the color components extracted from the designated area to generate an upper threshold and a lower threshold, respectively.

5. The image signal processing apparatus as set forth in claim 4, further comprising:
a saturation ratio conversion section configured to obtain a saturation ratio conversion value from the image signal in the designated target area; and
a hue conversion section configured to obtain a hue conversion value from the image signal in the designated target area,
wherein the threshold generation section adds the half value of the designation width to an average value of luminance values extracted from the designated target area to generate a luminance upper threshold, and generates a saturation ratio upper threshold and a saturation ratio lower threshold based on the saturation ratio conversion value, and a hue upper threshold and a hue lower threshold based on the hue conversion value.

6. The image signal processing apparatus as set forth in claim 2,
wherein the scaling processing section includes:
a first scaling processing section configured to convert pixels of an image signal to which the peaking signal has not been added; and
a second scaling processing section configured to convert pixels of an image signal to which the peaking signal has been added, and
wherein the mask processing section is configured to perform a mask process for the image signal whose pixels have been converted by the second scaling processing section, based on the area gate signal, supplied from the control section and combine the image signal for which the mask process has been performed and the image signal that is output from the first scaling processing section.

7. The image signal processing apparatus as set forth in claim 6,
wherein when the image signal for which contour correction has been performed has been caused to be displayed in an enlarged size through the operation section, the control section outputs to the second scaling processing section a scaling ratio setting signal causing a value larger than a value of the scaling ratio of the first scaling processing section to be applied and outputs to the mask processing section a two-screen combining control signal causing an image of an image signal that is output from the second screen processing section overlaid on an image of an image signal that is output from the first scaling processing section.

8. The image signal processing apparatus as set forth in claim 7, further comprising:
a first adding section configured to add to the input image signal the peaking signal generated in the peaking signal generation section and output a resultant signal to the first scaling processing section;
a second adding section configured to add to the input image signal the peaking signal generated in the peaking signal generation section and output a resultant signal to the second scaling processing section;
a first switch configured to output the peaking signal generated in the peaking signal generation section to the first adding section when connected; and
a second switch configured to output the peaking signal generated in the peaking signal generation section to the second adding section when connected,
wherein the control section is configured to control switching of connection or disconnection of the first switch and the second switch according to contents of an input operation of the operation section.

9. The image signal processing apparatus as set forth in claim 8,
wherein when a target area for which contour correction is to be performed has not been designated through the operation section, the control section connects the first switch, disconnects the second switch, and does not generate the area gate signal.

10. The image signal processing apparatus as set forth in claim 2, further comprising:
an adding section configured to add the peaking signal that has been input to the input image signal and output a resultant signal to the scaling processing section,
wherein when the area gate signal is supplied from the control section to the mask processing section, a mask process that gates an area designated by the area gate signal is performed for the peaking signal that is output from the peaking signal generation section and the peaking signal for which the mask process has been performed is output to the adding section.

11. An image capturing apparatus, comprising:
an image capturing section configured to convert light of an object entered through a lens into electricity to generate an image signal;
a peaking signal generation section configured to extract and amplify high frequency components contained in the image signal generated in the image capturing section to generate a peaking signal;
an operation section configured to allow a target area for which contour correction is to be performed using the peaking signal to be designated;
a control section configured to generate an area gate signal describing position information corresponding to the designated target area;
a mask processing section configured to perform a process of outputting an image signal to which the peaking signal has been added to the target area designated through the operation section based on the area gate signal supplied from the control section; and
a scaling processing section configured to convert pixels of the image signal for which a mask process has been performed at a predetermined scaling ratio,
wherein the scaling processing section converts pixels of an image signal that is output to the target area at a scaling ratio larger than a value of a scaling ratio applied to an image signal that is output to other than the designated target area when the scaling processing section has been caused to display an image signal for which the contour correction has been performed in an enlarged scale through the operation section.

12. The image capturing apparatus as set forth in claim 11, further comprising:
display section configured to display an image composed of an image signal to which the peaking signal has been added and/or the input image signal.

13. An image signal processing method, comprising the steps of:
extracting and amplifying high frequency components contained in an input image signal to generate a peaking signal;
allowing a target area for which contour correction is to be performed using the peaking signal to be accepted;
generating an area gate signal describing position information corresponding to the designated target area;
converting pixels of an image signal that is output to the designated target area at a value of a scaling ratio larger than a value of a scaling ratio applied to an image signal that is output to other than the designated target area, when the image signal for which contour correction has been performed has been caused to be displayed in an enlarged size; and performing a process of outputting an image signal to which the peaking signal has been added to the designated target area based on the area gate signal.

* * * * *